(12) United States Patent
Nader et al.

(10) Patent No.: US 12,550,063 B2
(45) Date of Patent: Feb. 10, 2026

(54) EFFICIENT WAKE-UP-SIGNAL PROVISION FOR WIRELESS DEVICES IN DISCONTINUOUS RECEPTION

(71) Applicant: Telefonaktiebolaget LM Ericsson (publ), Stockholm (SE)

(72) Inventors: Ali Nader, Malmö (SE); Sina Maleki, Malmö (SE); Niklas Andgart, Södra Sandby (SE); Andres Reial, Lomma (SE)

(73) Assignee: Valea AB, Stockholm (SE)

( * ) Notice: Subject to any disclaimer, the term of this patent is extended or adjusted under 35 U.S.C. 154(b) by 443 days.

(21) Appl. No.: 18/042,723

(22) PCT Filed: Aug. 23, 2021

(86) PCT No.: PCT/EP2021/073286
§ 371 (c)(1),
(2) Date: Feb. 23, 2023

(87) PCT Pub. No.: WO2022/043267
PCT Pub. Date: Mar. 3, 2022

(65) Prior Publication Data
US 2023/0354198 A1    Nov. 2, 2023

Related U.S. Application Data

(60) Provisional application No. 63/069,618, filed on Aug. 24, 2020.

(51) Int. Cl.
*H04W 52/02*     (2009.01)
*H04W 68/00*     (2009.01)
(Continued)

(52) U.S. Cl.
CPC ..... *H04W 52/0235* (2013.01); *H04W 68/005* (2013.01); *H04W 72/232* (2023.01); *H04W 76/28* (2018.02)

(58) Field of Classification Search
CPC .......... H04W 52/0235; H04W 68/005; H04W 72/232; H04W 76/28; H04W 68/025;
(Continued)

(56) References Cited

U.S. PATENT DOCUMENTS

2012/0122495 A1    5/2012   Weng et al.
2018/0338281 A1*  11/2018   Bangolae ............. H04W 68/02
(Continued)

OTHER PUBLICATIONS

3GPP TSG RAN WG1 #102-e; R1-2006527; Source: Apple Inc.; Title: Potential paging enhancements for idle/inactive-mode UE power saving; e-Meeting, Aug. 17-28, 2020 (Year: 2020).*
(Continued)

*Primary Examiner* — Mohammed S Chowdhury
(74) *Attorney, Agent, or Firm* — Weisberg I.P. Law, P.A.

(57) ABSTRACT

A method, network node and wireless device (WD) for efficient wake up signal provisioning for WDs in discontinuous reception are disclosed. According to one aspect, a method includes at a first paging occasion (PO) in which the network node transmits paging-related downlink control information to a first group of WDs, multiplexing paging indicators related to one or more POs to be monitored by a WD belonging to a second group of WDs.

21 Claims, 15 Drawing Sheets

(51) Int. Cl.
*H04W 72/232* (2023.01)
*H04W 76/28* (2018.01)

(58) Field of Classification Search
CPC ......... H04W 52/0212; H04W 52/0219; H04W 52/0229; Y02D 30/70
See application file for complete search history.

(56) References Cited

U.S. PATENT DOCUMENTS

| | | | |
|---|---|---|---|
| 2020/0053645 A1* | 2/2020 | Charbit | H04W 68/005 |
| 2020/0107267 A1* | 4/2020 | Wu | H04W 76/28 |
| 2021/0044394 A1* | 2/2021 | Beale | H04W 72/121 |
| 2022/0303897 A1* | 9/2022 | Xu | H04W 76/28 |
| 2022/0303941 A1* | 9/2022 | Xu | H04W 52/0229 |
| 2022/0312327 A1* | 9/2022 | Xu | H04W 52/0216 |
| 2022/0394664 A1* | 12/2022 | Xie | H04W 68/005 |
| 2023/0084797 A1* | 3/2023 | Shan | H04W 68/025 455/458 |

OTHER PUBLICATIONS

3GPP TSG RAN WG1 #102-e; R1-2005615; Source: MediaTek Inc.; Title: Evaluation methodology and paging enhancements for idle/inactive mode UE power saving; e-Meeting, Aug. 17-28, 2020 (Year: 2020).*

International Search Report and Written Opinion dated Dec. 8, 2021 for International Application No. PCT/EP2021/073286 filed Aug. 23, 2021, consisting of 17-pages.

3GPP TSG-RAN WG2 Meeting #111 electronic R2-2008361 Revision of R2-2007190; Title: Paging Enhancements for UE Power Saving in NR; Agenda Item: 8.9.2; Source: MediaTek Inc.; Document for: Discussion and decision; Date and Location: Aug. 17-28, 2020, online, consisting of 8-pages.

3GPP TSG-RAN WG1 #102 R1-2006157 (downloading as R1-2006159); Title: On potential paging enhancements; Agenda Item: 8.7.1.1; Source: Samsung; Document for: Discussion and decision; Date and Location: Aug. 17-28, 2020, e-meeting, consisting of 10-pages.

3GPP TSG-RAN2 Meeting #111-e R2-2007260; Title: Paging enhancement to reduce unnecessary UE paging receptions; Agenda Item: 8.9.2 Idle/Inactive-mode UE power saving; Source: Ericsson; Document for: Discussion and Decision; Date and Location: Aug. 17-28, 2020, e-meeting, consisting of 5-pages.

3GPP TSG RAN WG1 #103-e Tdoc R1-2009200; Title: Discussion on potential paging enhancements for UE power savings; Agenda Item: 8.7.1.1; Source: Ericsson; Document for: Discussion and Decision; Date and Location: Oct. 26-Nov. 13, 2020, e-meeting, consisting of 11-pages.

3GPP TSG RAN WG1 #106-e R2-2107998; Title: Design of Paging Enhancements; Agenda Item: 8.7.1.1; Source: Ericsson; Document for: Discussion and Decision; Date and Location: Aug. 16-27, 2021, e-meeting, consisting of 16-pages.

ETSI TS 138 212 V16.2.0; Technical Specification; 5G; NR; Multiplexing and channel coding (3GPP TS 38.212 version 16.2.0 Release 16); Jul. 2020, consisting of 154-pages.

3GPP TS 38.331 V16.4.0; 3rd Generation Partnership Project; Technical Specification Group Radio Access Network; NR; Radio Resource Control (RRC) protocol specification (Release 16); Mar. 2021, consisting of 949-pages.

* cited by examiner

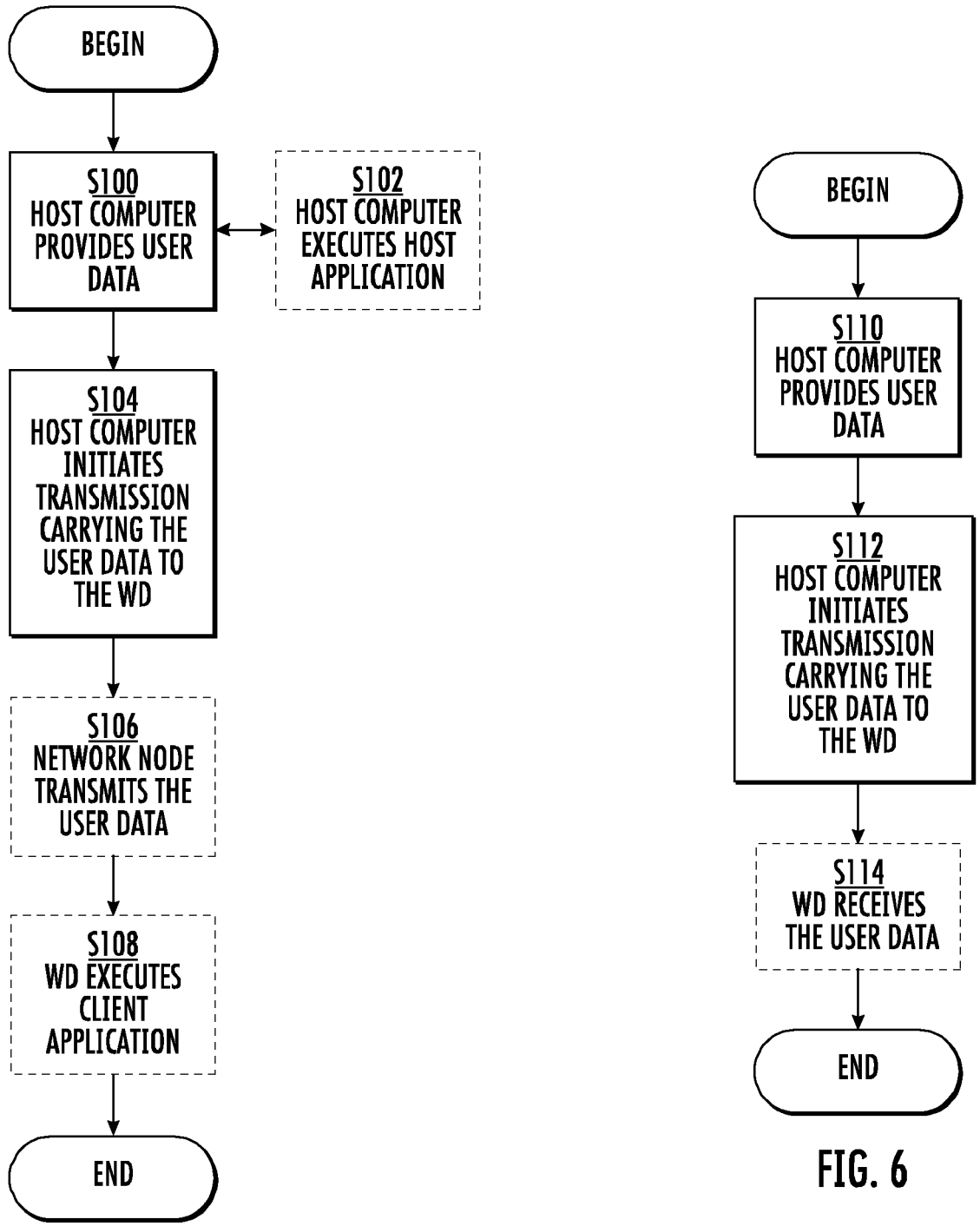

EFFICIENT WAKE-UP-SIGNAL PROVISION FOR WIRELESS DEVICES IN DISCONTINUOUS RECEPTION

CROSS-REFERENCE TO RELATED APPLICATIONS

This application is a Submission Under 35 U.S.C. § 371 for U.S. National Stage Patent Application of International Application No.: PCT/EP2021/073286, filed Aug. 23, 2021 entitled "EFFICIENT WAKE-UP-SIGNAL PROVISION FOR WIRELESS DEVICES IN DISCONTINUOUS RECEPTION," which claims priority to U.S. Provisional Application No. 63/069,618, filed Aug. 24, 2020, entitled "EFFICIENT WAKE-UP-SIGNAL PROVISION FOR WDS IN DRX," the entireties of both of which are incorporated herein by reference.

FIELD

The present disclosure relates to wireless communications, and in particular, to efficient wake up signal provisioning for wireless devices in discontinuous reception (DRX).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

A 5G/NR WD in RRC_IDLE and RRC_INACTIVE states operates in a so-called discontinuous reception (DRX) mode enabling the WD to save power. During the DRX mode, the WD occasionally wakes up according to a network (NW)-configured scheme and listens to a paging channel. In case the network node is interested in reaching the WD, the network node pages the WD at these configured occasions whereby the WD establishes a connection to the network node. The paging message from the network node can be either initiated by the Core NW (CN) or the network node itself, where the network node is a base station such as a gNB. More specifically, the CN-initiated paging is used to reach the WDs in RRC_IDLE state, whereas the network node-initiated paging (also known as radio access network (RAN) paging) is used to reach WDs in RRC_INACTIVE state.

The paging message from the network node is carried out via a physical downlink control channel (PDCCH) or physical downlink shared channel (PDSCH) combination similar to other scheduled data in the downlink (DL). When the network node has DL data for a WD, it transmits on the Physical Downlink Control Channel (PDCCH), a Downlink Control Information (DCI) container (or message) with details about where and how the WD can find data in a Physical Downlink Shared Channel (PDSCH). Various formats of DCI exist in the 3GPP specifications; for example, for the paging message, a DCI format 1_0 is used for which the generated Cyclic Redundancy Check (CRC) bits of the DCI are scrambled with a specific value called a paging radio network temporary identifier (P-RNTI) (such as, for example, 0XFFFE).

The network node typically configures several paging occasions (POs) per DRX cycle (e.g., 128 POs within a DRX cycle of 1.28 seconds). The paging configuration, i.e., the number of paging occasions (POs) and their positions in time is broadcast over the air in system information (part of system information block 1 (SIB1) contents). When a WD registers with the network node, the WD is assigned a WD identity called a serving temporary mobile subscriber identity (S-TMSI). This identity is used by the WD and network node in a formula specified by the 3GPP to determine in which of the configured paging occasions the WD will listen for a potential paging message. Note that several WDs could be listening for a potential paging message at the very same paging occasion (PO). In case the WDs detect a paging DCI (i.e. DCI 1_0 with P-RNTI with scrambled CRC), each WD looks in the payload of the PDSCH to see whether the WD's identity is present and hence, if the paging message was intended for the WD. The payload of the PDSCH might carry up to 32 identities; i.e., up to 32 WDs may be paged at the very same paging occasion. Even though a WD's 5G-S-TMSI is used in the formulas for deriving the paging occasion, the identity that the WD looks for inside the PDSCH may be of a type other than the S-TMSI. In case the WD is in RRC_IDLE state, the WD looks for the WD's 5G-S-TMSI (i.e., looks for the CN-Initiated paging message). In contrast in case the WD is in RRC_INACTIVE state, the WD looks for both the 5G-S-TMSI and the RAN-assigned inactive (I)-RNTI identity. Thus, a WD in RRC_INACTIVE state may be either paged by the CN or the RAN and hence, should look for both assigned identities.

The contents of a 3GPP Release-16 (Rel-16) DL paging-related DCI format 1-0 (with the CRC scrambled by the P-RNTI) used for scheduling of a paging-related PDSCH is shown in the 3GPP Technical Standard (TS) 38.212. Note that there exist several reserved bits for future usage. The contents may include one or more of the following:

Short Messages Indicator (2 bits);

Short Messages (8 bits). If only the scheduling information for Paging is carried, this bit field is reserved. Bits 4-8 are reserved for future use;

Frequency domain resource assignment (variable bit length dependent on bandwidth (BW))—If only the short message is carried, this bit field is reserved;

Time domain resource assignment (4 bits). If only the short message is carried, this bit field is reserved;

Virtual resource block to physical resource block (VRB-to-PRB) mapping (1 bit). If only the short message is carried, this bit field is reserved;

Modulation and coding scheme (MCS) (5 bits). If only the short message is carried, this bit field is reserved;

Transport Block (TB) scaling (2 bits). If only the short message is carried, this bit field is reserved; and Reserved bits—8 bits for operation in a cell with shared spectrum channel access; otherwise 6 bits.

In 3GPP NR Release 15 (Rel-15), multiple synchronization signal blocks (SSBs) may be configured per cell, each cell covering different regions. The SSBs are transmitted in an SSB burst fashion. A typical SSB burst periodicity is 20 ms. In other words, if only one SSB is transmitted in the cell, which is assumed herein for simplicity, the same SSB is transmitted every 20 ms in the cell.

Paging signaling (on the PDCCH and PDSCH) are specified to have a quasi-colocation relation with an SSB in a cell, meaning that a WD that receives an SSB with a certain receiver configuration can rely on that the same spatial receive (RX) configuration and time and/or frequency (T/F) offsets will be valid for paging reception. For a WD in NR, in order to be able to receive the paging signaling properly, channel estimates are typically carried out on the SSB(s) prior to the PO. The number of SSBs required for channel estimation prior to PO reception depends on a WD perceived coverage level, whether the reception is for PDCCH only or both PDCCH and PDSCH, and the hardware architecture (e.g., number of Rx chains).

Paging occasion (PO) monitoring in NR accounts for a significant part of the WD power consumption, particularly in RRC_IDLE/INACTIVE states. WDs 22 need to wake up and decode a paging PDCCH in their assigned PO at every discontinuous reception (DRX) cycle. If successful PDCCH decoding is performed and there is an indication about potential paging, the WDs 22 then need to decode the accompanied PDSCH in order to know whether they are actually paged. To be able to perform such decoding of paging related channels (PDCCH/PDSCH), the NR WD typically needs to employ one or more synchronization signals (e.g., SSBs, potential tracking reference signals (TRS), or other reference signals) prior to its paging related channel decoding. The amount of SSBs needed is dependent on various factors such as coverage level (where low signal to interference plus noise ratio (SINR) conditions might require more SSBs than high SINR conditions), hardware (HW) architecture (e.g., Reduced Capability (RedCap) devices with a simple receiver architecture might need more SSBs), type of activity to be performed (e.g., PDCCH-only reception may require less SSB processing than PDSCH reception), etc.

FIG. 1 depicts a typical WD behavior in IDLE/INACTIVE states as related to paging reception.

In cases where the WD is not paged (which is the typical case), unnecessary WD energy is wasted on SSB processing and associated radio "on" time related to channel sampling and decoding. Note that the time in-between the SSBs and the channel processing might not be sufficiently large for the WD to fall into efficient sleep states and benefit from power saving schemes.

FIG. 2 is an example in which the WD is paged during the first DRX cycle, but not in the second and third DRX cycles where the WD unnecessarily wastes power.

In one known solution, a paging indication for a WD for the PO in the next DRX cycle may be embedded in the paging PDCCH in the current PO. While this approach enables the WD to omit unnecessary PDSCH reception preparation at the next PO if no paging is to be received, it introduces an additional paging delay of one DRX cycle length, TDRX, increasing the mean delay from TDRX/2 to 3TDRX/2.

SUMMARY

There is a need for mechanisms which allow the WD to relax synchronization while operating in IDLE/INACTIVE states without imposing a significant paging latency penalty. Some embodiments advantageously provide methods, network nodes and wireless devices for efficient wake up signal provisioning for wireless devices in discontinuous reception.

Some embodiments enable the WD to reduce synchronization and channel processing stages related to paging reception compared to known methods, thereby achieving power savings when the WD is not paged. Some embodiments further reduce the advance indication overhead for the network node such that extra transmissions are avoided to a maximum extent.

More specifically, at a first paging occasion (PO) in which the network node may transmit paging-related DCI to a first group of WDs, the network node multiplexes paging indicator(s) related to one or more other POs that will be monitored by a WD of interest belonging to a second group of WDs.

From the WD perspective, the indicators at a first occasion may act as wakeup signals (WUS) for WDs belonging to a second occasion. If the indicator at the first occasion is detected, the WD of interest belonging to the second occasion will know that it should wake up and perform synchronization and paging decoding-related operations. If no indicator is detected, the WD may omit the second PO (PDCCH and PDSCH monitoring and reception) and associated preparation activities (e.g., SSB reception). While the WD still wakes up once each DRX cycle, it needs only to prepare for PDCCH reception, requiring fewer SSBs of other reference signals (RS) for preparation.

The time offset between the 1st and 2nd PO may be selected to enable the WD to acquire a number of synchronization signals/symbols such as SSBs sufficient for PDSCH reception preparation.

From the network node perspective, at most times, the network node utilizes already existing transmissions related to the first PO for conveying information about presence of paging for a WD belonging to another PO.

According to one aspect, a network node configured to communicate with a plurality of wireless devices is provided. The network node includes processing circuitry configured to provide a wake up signal for transmission in a downlink control channel associated with a first paging opportunity assigned to a first WD, the wake up signal indicating to a second WD to wake up for a second paging opportunity assigned to the second WD, the first paging opportunity being prior to the second paging opportunity. The network node also includes a radio interface in communication with the processing circuitry, the radio interface configured to transmit the wake up signal to the second WD.

According to this aspect, in some embodiments, the processing circuitry is further configured to set a time between two successive paging opportunities to enable the second WD to acquire synchronization signals for downlink shared channel reception preparation, the time between the two successive paging opportunities being set to be less than a duration of a discontinuous reception cycle of one of the first WD and the second WD. In some embodiments, the time setting is selected to achieve a least amount of latency consistent with a duration of a synchronization signal. In some embodiments, the wake up signal is included in a downlink control information, DCI, message carried by a physical downlink control channel, PDCCH. In some embodiments, the radio interface is further configured to transmit an indication to the second WD as to which of at least one paging downlink control information bits of the wake up signal transmitted at the first paging opportunity are to be used to evaluate whether to wake up at the second paging opportunity. In some embodiments, the processing circuitry is further configured to multiplex wake up signals for a plurality of WDs, the plurality of WDs including the second WD. In some embodiments, the radio interface is further configured to transmit the multiplexed wake up signals using an aggregation of control channel elements. In some embodiments, the wake up signal transmitted at the first paging opportunity includes a plurality of fields for signaling a plurality of WDs including the second WD to wake up. In some embodiments, a bandwidth part is selected to accommodate the aggregation of control channel elements when a WD of the plurality of WDs is in IDLE mode. In some embodiments, the wake up signal for the second paging opportunity is adapted to a capability of the second WD. In some embodiments, a capability of the second WD is determined based at least in part on a coverage signal from the second WD. In some embodiments, the processing circuitry is further configured to configure the second WD with multiple bits indicating a presence of paging in a particular paging opportunity indicated by the multiple bits. In some embodiments, the wake up signal indicates a subset of subsequent paging opportunity for the second WD to wake up. In some embodiments, the wake up signal is transmitted on a subset of beams transmitted by the network node. In some embodiments, the processing circuitry is further configured to indicate in a downlink control information, DCI, message whether the DCI message includes one of a paging message, a short messaging service, SMS, message, and an early indicator of a subsequent paging opportunity. In some embodiments, the DCI indicates a current paging downlink shared channel and a paging at a subsequent paging opportunity.

According to another aspect, a method in a network node configured to communicate with a wireless device is provided. The method includes providing a wake up signal for transmission in a downlink control channel associated with a first paging opportunity assigned to a first WD, the wake up signal indicating to a second WD to wake up for a second paging opportunity assigned to the second WD, the first paging opportunity being prior to the second paging opportunity. The method also includes transmitting the wake up signal to the second WD.

According to this aspect, in some embodiments, the method further includes setting a time between two successive paging opportunities to enable the second WD to acquire synchronization signals for downlink shared channel reception preparation, the time between the two successive paging opportunities being set to be less than a duration of a discontinuous reception cycle of one of the first WD and the second WD. In some embodiments, the time setting is selected to achieve a least amount of latency consistent with a duration of a synchronization signal. In some embodiments, the wake up signal is included in a downlink control information, DCI, message carried by a physical downlink control channel, PDCCH. In some embodiments, the method also includes transmitting an indication to the second WD as to which of at least one paging downlink control information bits of the wake up signal transmitted at the first paging opportunity are to be used to evaluate whether to wake up at the second paging opportunity. In some embodiments, the method also includes multiplexing wake up signals for a plurality of WDs, the plurality of WDs including the second WD. In some embodiments, the method also includes transmitting the multiplexed wake up signals using an aggregation of control channel elements. In some embodiments, the wake up signal transmitted at the first paging opportunity includes a plurality of fields for signaling a plurality of WDs including the second WD to wake up. In some embodiments, a bandwidth part is selected to accommodate the aggregation of control channel elements when a WD of the plurality of WDs is in IDLE mode. In some embodiments, the wake up signal for the second paging opportunity is adapted to a capability of the second WD. In some embodiments, a capability of the second WD is determined based at least in part on a coverage signal from the second WD. In some embodiments, the method includes configuring the second WD with multiple bits indicating a presence of paging in a particular paging opportunity indicated by the multiple bits. In some embodiments, the wake up signal indicates a subset of subsequent paging opportunity for the second WD (22) to wake up. In some embodiments, the wake up signal is transmitted on a subset of beams transmitted by the network node. In some embodiments, the method further includes indicating in a downlink control information, DCI, message whether the DCI message includes one of a paging message, a short messaging service, SMS, message, and an early indicator of a subsequent paging opportunity. In some embodiments, the DCI indicates a current paging downlink shared channel and a paging at a subsequent paging opportunity.

According to yet another aspect, a wireless device is configured to communicate with a network node. The WD includes a radio interface configured to receive a wake up signal from the network node prior to a first paging opportunity and before an end to a discontinuous reception, DRX, cycle used by the WD, the DRX cycle encompassing the first paging opportunity, the wake up signal being transmitted in a downlink control channel associated with a second paging opportunity assigned with a different WD, and to receive a paging signal from the network node at the first paging opportunity, the second paging opportunity being prior to the first paging opportunity. The WD also includes processing circuitry in communication with the radio interface, the processing circuitry configured to evaluate synchronization signals between a time of receiving the paging signal and a time of receiving the wake up signal.

According to this aspect, in some embodiments, the radio interface is further configured to receive an indication of at least one downlink control information bit to be evaluated to determine whether to wake up. In some embodiments, the processing circuitry is further configured to select a paging opportunity based on an indication included in the wake up signal. In some embodiments, the processing circuitry is further configured to decode a downlink control channel at a paging opportunity corresponding to the first paging opportunity when the WD fails to detect the indication. In some embodiments, the processing circuitry is further configured to assume a network wide applicability of a paging configuration when the WD is in an inactive state and to reacquire a paging configuration when the WD is in an idle state.

According to another aspect, a method in a wireless device configured to communicate with a network node is provided. The method includes receiving a wake up signal from the network node prior to a first paging opportunity and before an end to a discontinuous reception, DRX, cycle used by the WD, the first DRX cycle encompassing the first paging opportunity, the wake up signal being transmitted in a downlink control channel associated with a second paging opportunity assigned to a different WD. The method also includes receiving a paging signal from the network node at the first paging opportunity, the second paging opportunity being prior to the first paging opportunity. The method also includes evaluating synchronization signals between a time of receiving the paging signal and a time of receiving the wake up signal.

According to this aspect, in some embodiments, the method also includes receiving an indication of at least one downlink control information bit to be evaluated to determine whether to wake up. In some embodiments, the method includes selecting a paging opportunity based on an indication included in the wake up signal. In some embodiments, the method includes decoding a downlink control channel at a paging opportunity corresponding to the first paging opportunity when the WD fails to detect the indication. In some embodiments, the method includes assuming a network wide applicability of a paging configuration when the WD is in an inactive state and to reacquire a paging configuration when the WD is in an idle state.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

DETAILED DESCRIPTION

Figure 1:
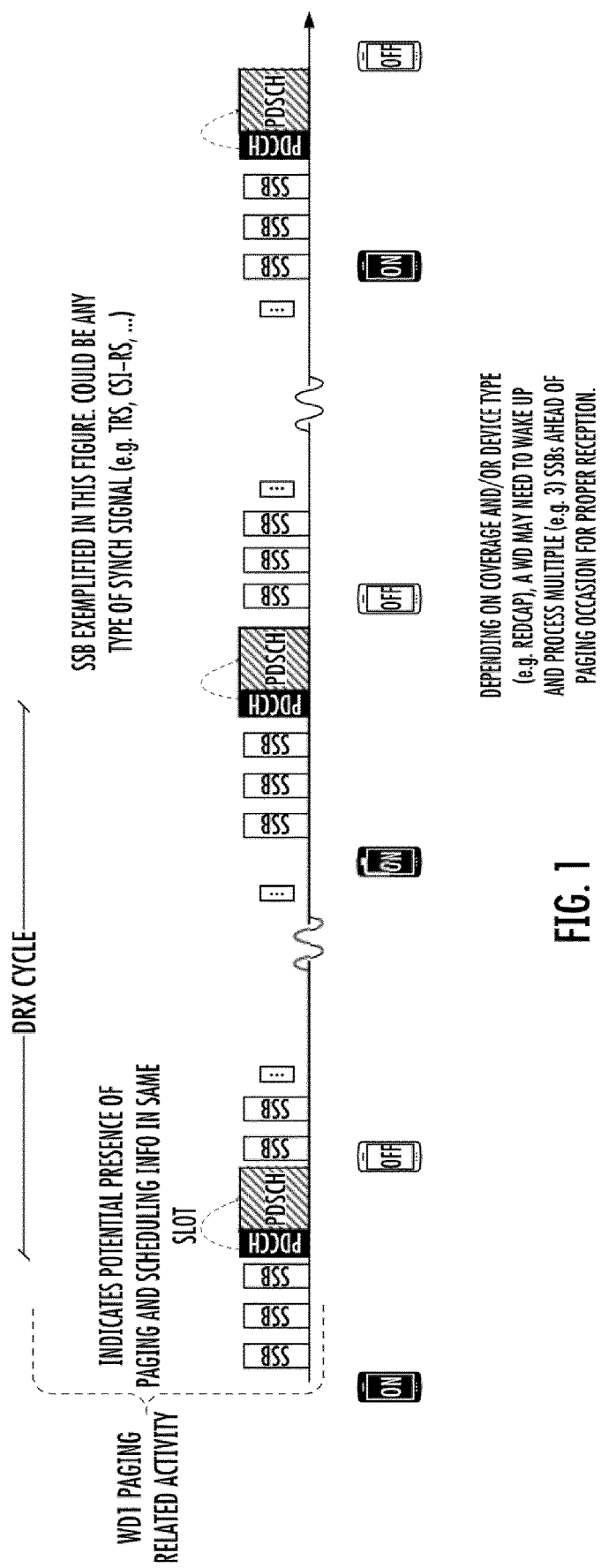
FIG. 1 depicts typical wireless device (WD) behavior in IDLE/INACTIVE states related to paging reception.

Before describing in detail exemplary embodiments, it is noted that the embodiments reside primarily in combinations of apparatus components and processing steps related to efficient wake up signal provisioning for wireless devices in discontinuous reception. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices. Note that when reference is made to a network node transmitting a signal to a particular wireless device, the transmitted signal may be broadcast or unicast, unless indicated otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments include mechanisms with which the WD can reduce unnecessary synchronization and channel processing stages related to paging reception, thereby achieving power savings in cases the WD is not paged. The mechanisms further reduce the advance indication overhead for the network node such that extra transmissions are avoided to the extent possible.

Some embodiments lead to reduction of WD power consumption by reducing the amount of awake/processing time the WD spends periodically in IDLE/INACTIVE for the sake of paging reception.

At the same time, compared to conventional methods, some embodiments reduce the network node signaling overhead when aiding the WD in the described power saving scheme. In some embodiments, processing overhead may be incurred only when the first PO is not utilized for scheduling a paging PDSCH transmission for the first set of WDs 22. This is in contrast to schemes with dedicated WUS transmission where an additional transmission (e.g. PDCCH) is required for every occupied PO.

Figure 3:
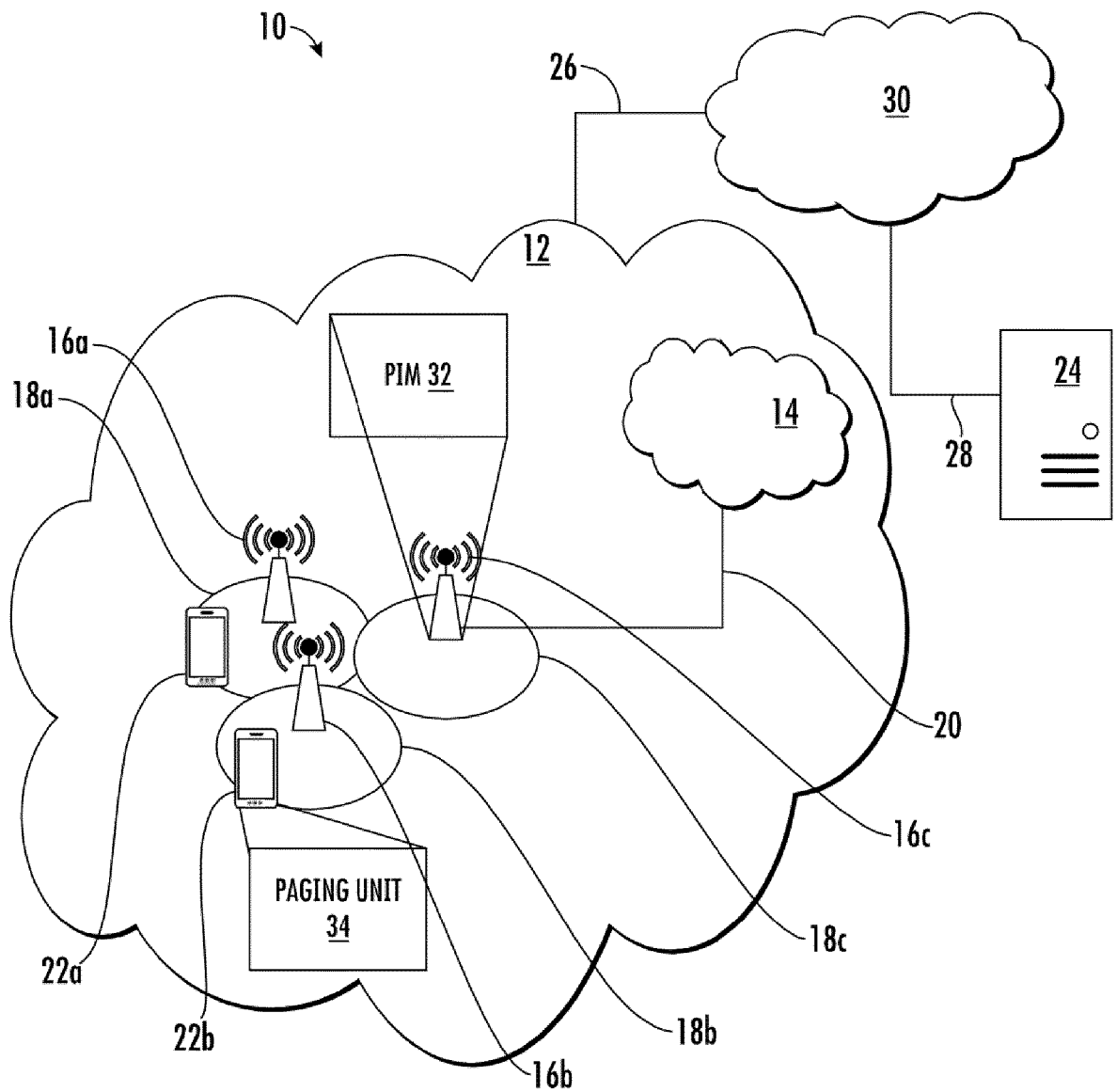
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 22 and three network nodes 16 are shown for convenience, the communication system may include many more WDs 22 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22 and the host computer 24. The connectivity may be described as an over-the-top (OTT) connection. The host computer 24 and the connected WDs 22 are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a paging indicator multiplexer (PIM) 32 which is configured to multiplex paging indicators related to one or more POs to be monitored by a WD belonging to a group of WDs 22. A wireless device 22 is configured to include a paging unit 34 which is configured to perform paging operations that include preparing for physical downlink control channel (PDCCH) reception.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a paging indicator multiplexer (PIM) 32 which is configured to multiplex paging indicators related to one or more POs to be monitored by a WD belonging to a group of WDs 22. The processing circuitry 68 of the network node 16 may include a WUS unit 76 which is configured to provide a wake up signal for transmission in a downlink control channel associated with a first paging opportunity assigned to a first WD, the wake up signal indicating to a second WD to wake up for a second paging opportunity assigned to the second WD.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a paging unit 34 which is configured to perform paging operations that include preparing for physical downlink control channel (PDCCH) reception. The processing circuitry 84 of the wireless device 22 may also include a synchronization unit 78 which is configured to evaluate synchronization signals between a time of receiving the paging signal and a time of receiving the wake up signal.

Figure 4:
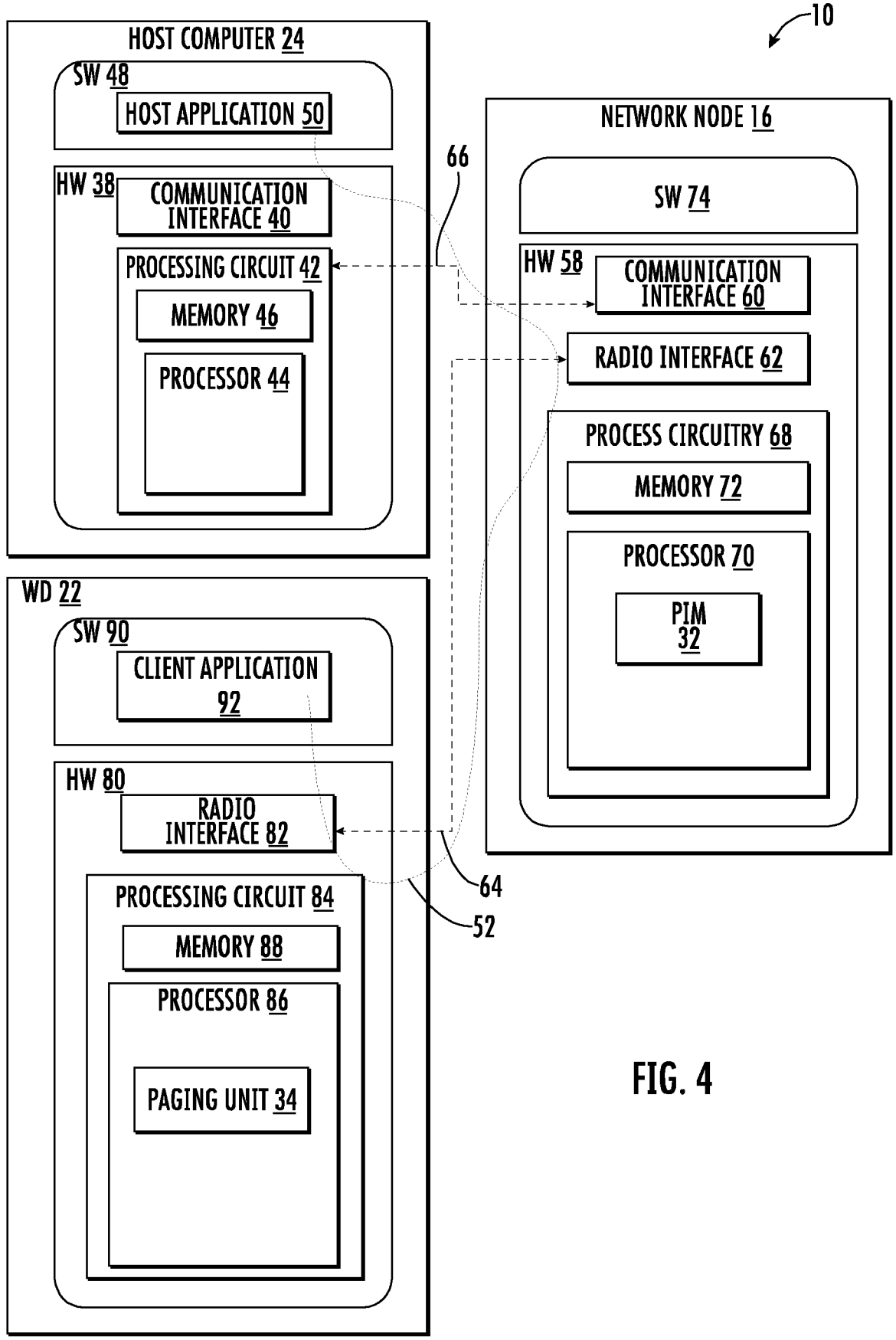
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as PIM 32, paging unit 34, WUS unit 76 and synchronization unit 78, as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
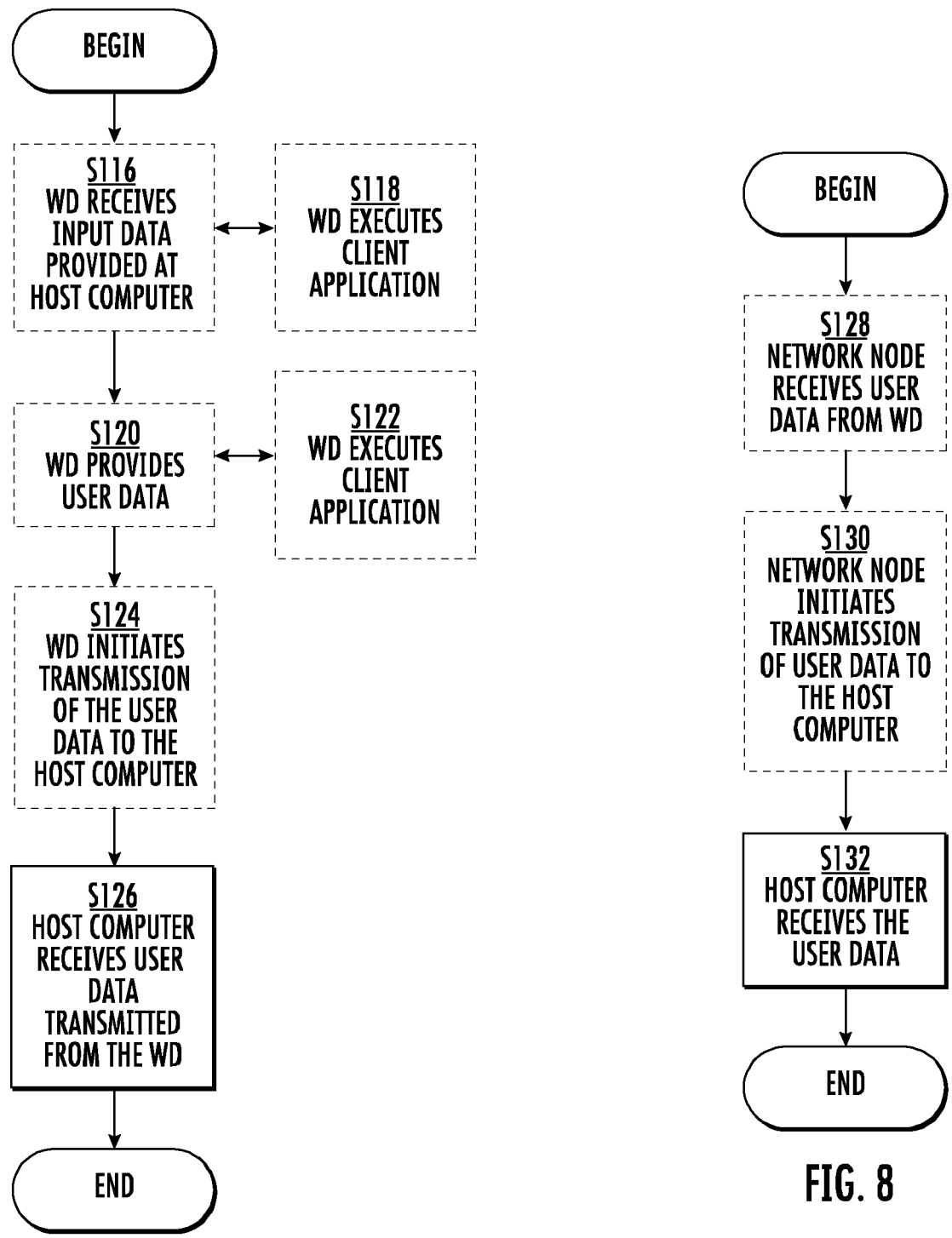
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
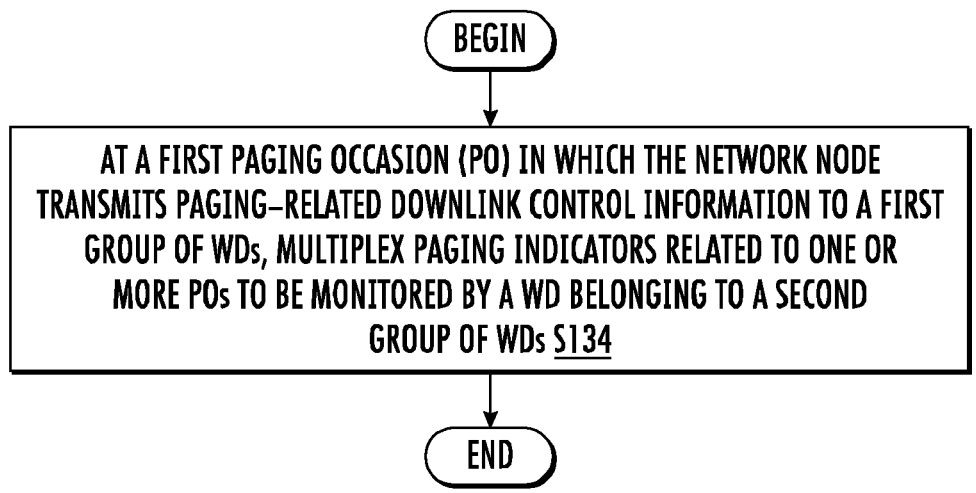
FIG. 9 is a flowchart of an exemplary process in a network node for efficient wake up signal provisioning for wireless devices in discontinuous reception.

FIG. 9 is a flowchart of an exemplary process in a network node 16 for efficient wake up signal provision for wireless devices (WDs) 22 in discontinuous reception. One or more blocks described herein may be performed by one or more elements of network node 16 such as by one or more of processing circuitry 68 (including the PIM 32), processor 70, radio interface 62 and/or communication interface 60. Network node 16 such as via processing circuitry 68 and/or processor 70 and/or radio interface 62 and/or communication interface 60 is configured to at a first paging occasion (PO) in which the network node transmits paging-related downlink control information to a first group of WDs 22, multiplex paging indicators related to one or more POs to be monitored by a WD 22 belonging to a second group of WDs 22 (Block S134).

Figure 10:
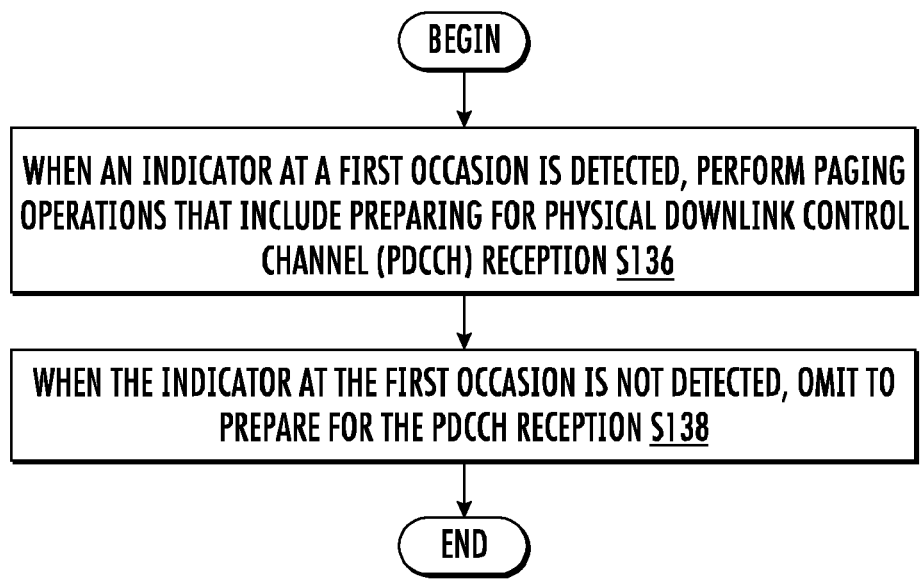
FIG. 10 is a flowchart of an exemplary process in a wireless device for paging operations during discontinuous reception (DRX)

FIG. 10 is a flowchart of an exemplary process in a wireless device 22 according to some embodiments of the present disclosure. One or more blocks described herein may be performed by one or more elements of wireless device 22 such as by one or more of processing circuitry 84 (including the paging unit 34), processor 86, radio interface 82 and/or communication interface 60. Wireless device 22 such as via processing circuitry 84 and/or processor 86 and/or radio interface 82 is configured to, when an indicator at a first occasion is detected, perform paging operations that include preparing for physical downlink control channel (PDCCH) reception (Block S136). The process also includes when the indicator at the first occasion is not detected, omit to prepare for the PDCCH reception (Block S138).

Figure 11:
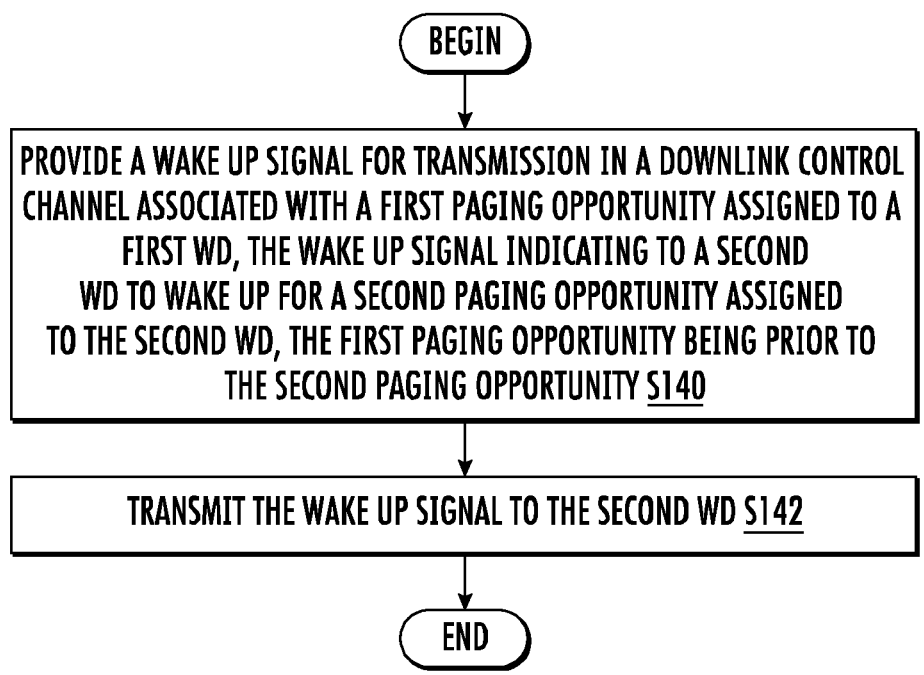
FIG. 11 is a flowchart of another example process in a network node for efficient wake up signal provisioning according to principles set forth herein.

FIG. 11 is a flowchart of an exemplary process in a network node 16 for efficient wake up signal provision for wireless devices (WDs) 22 in discontinuous reception. One or more blocks described herein may be performed by one or more elements of network node 16 such as by one or more of processing circuitry 68 (including the PIM 32), processor 70, radio interface 62 and/or communication interface 60. Network node 16 such as via processing circuitry 68 and/or processor 70 and/or radio interface 62 and/or communication interface 60 is configured to provide a wake up signal for transmission in a downlink control channel associated with a first paging opportunity assigned to a first WD, the wake up signal indicating to a second WD to wake up for a second paging opportunity assigned to the second WD (Block S140). The process also includes transmitting the wake up signal to the second WD, the first paging opportunity being prior to the second paging opportunity (Block S142).

Figure 12:
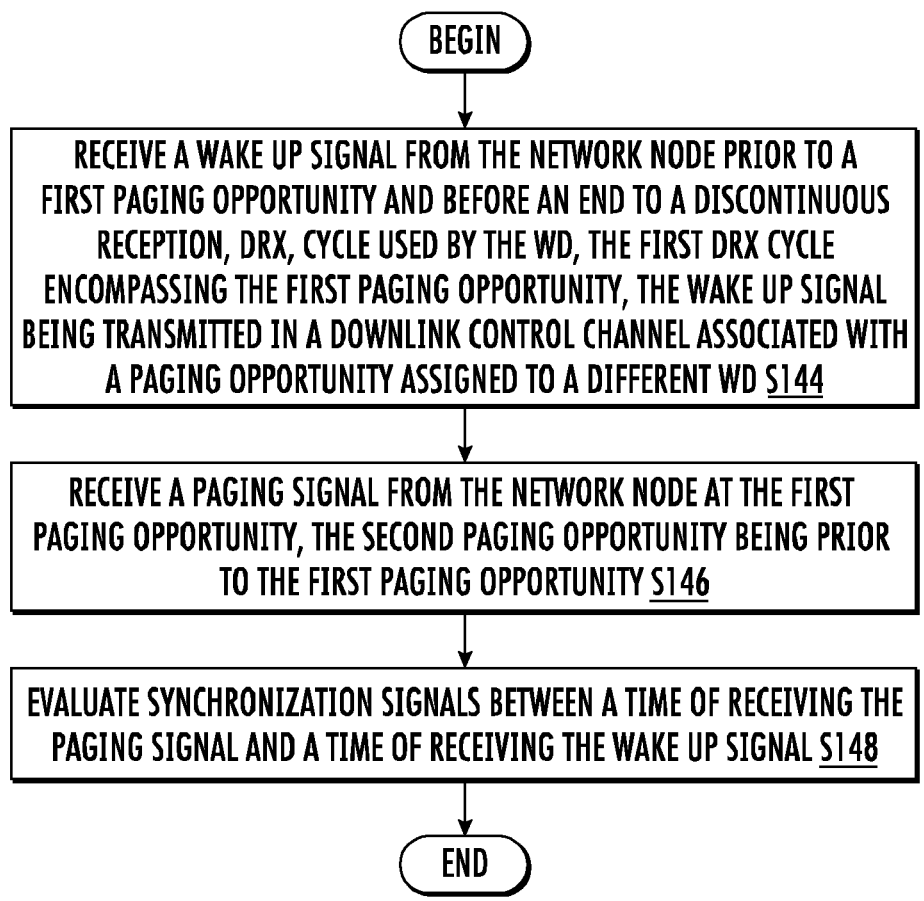
FIG. 12 is a flowchart of another example process in a WD for paging operations during DRX according to principles set forth herein.

FIG. 12 is a flowchart of an exemplary process in a wireless device 22 according to some embodiments of the present disclosure. One or more blocks described herein may be performed by one or more elements of wireless device 22 such as by one or more of processing circuitry 84 (including the paging unit 34), processor 86, radio interface 82 and/or communication interface 60. Wireless device 22 such as via processing circuitry 84 and/or processor 86 and/or radio interface 82 is configured to receive a wake up signal from the network node prior to a first paging opportunity and before an end to a discontinuous reception, DRX, cycle used by the WD, the DRX cycle encompassing the first paging opportunity, the wake up signal being transmitted in a downlink control channel associated with a second paging opportunity assigned with a different WD (Block S144). The process also includes receiving a paging signal from the network node at the first paging opportunity, the second paging opportunity being prior to the first paging opportunity (Block S146). The process further includes evaluating synchronization signals between a time of receiving the paging signal and a time of receiving the wake up signal (Block S148).

Having described the general process flow of arrangements of the disclosure and having provided examples of hardware and software arrangements for implementing the processes and functions of the disclosure, the sections below provide details and examples of arrangements for efficient wake up signal provisioning for wireless devices (WDs) 22 in discontinuous reception.

More specifically, at a first paging occasion (PO) in which the network node 16 may transmit paging-related DCI to a first group of WDs 22, the network node 16 may be configured to multiplex paging indicator(s) related to one or more other POs that will be monitored by a WD 22 of interest belonging to a second group of WDs 22.

From the WD 22 perspective, the indicators at a first occasion act as wakeup signals (WUS) for WDs 22 belonging to a second occasion. If the indicator at the first occasion is detected, the WD 22 of interest belonging to the second occasion will know that it needs to wake up and perform synchronization and paging decoding-related operations. If no indicator is detected, the WD 22 may omit the second PO (for example, omission of PDCCH and PDSCH monitoring and/or reception) and associated preparation activities (e.g., SSB reception). While the WD 22 still wakes up once each DRX cycle, it needs only to prepare for PDCCH reception, requiring fewer SSBs of other reference signals (RS) for preparation.

The time offset between the 1st and 2nd PO may be selected to enable the WD 22 to acquire a number of synchronization signals and/or symbols such as SSBs sufficient for PDSCH reception preparation.

From the network node 16 perspective, at most times, the network node 16 utilizes already existing transmissions related to the first PO for conveying information about presence of paging for a WD 22 belonging to another PO.

Some embodiments provide for reduction of WD 22 power consumption by reducing the amount of awake/processing time the WD 22 spends periodically in IDLE/INACTIVE states for the sake of paging reception.

Figure 2:
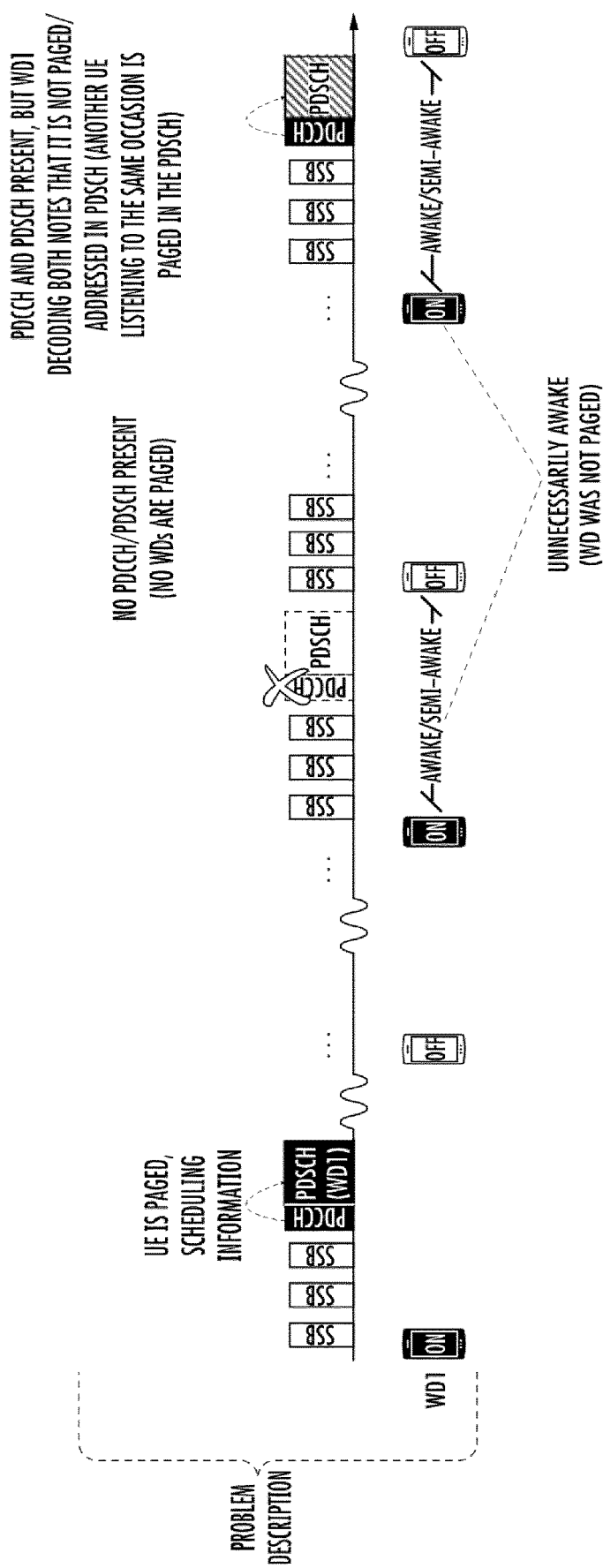
FIG. 2 is an example in which the WD is paged during the first discontinuous reception (DRX) cycle, but not in the second and third DRX cycles where the WD unnecessarily wastes power.
Figure 13:
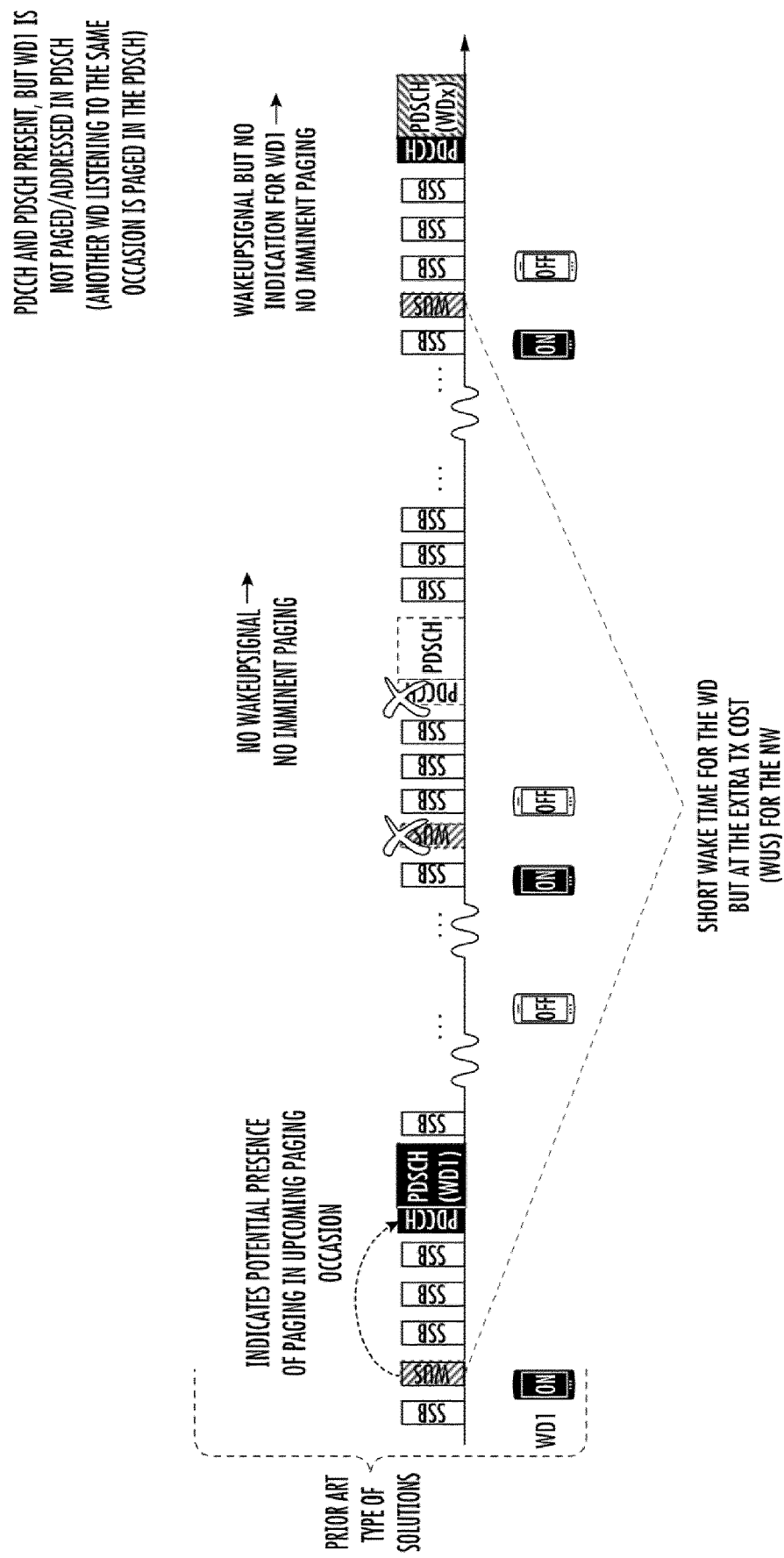
FIG. 13 depicts timing according to one embodiment constructed in accordance with principles set forth herein.

At the same time, compared to conventional methods, some embodiments may reduce the network node 16 signaling overhead when aiding the WD 22 in the described power saving scheme. Overhead may now occur only when the first PO is not utilized for scheduling a paging PDSCH transmission for the first set of WDs 22, in some embodiments. This is in contrast to schemes with dedicated wake up signal (WUS) transmission where an additional transmission (e.g., PDCCH) is required for every occupied PO The description herein aims to reduce or eliminate the unnecessary power-consuming WD 22 activity pointed out in FIG. 2 related to paging reception. In some known systems, wake-up signals (WUS) have been described for a similar purpose; narrow band Internet of things (NB-IoT) idle mode WUS, and/or a WUS in NR connected mode. Such WUS signals can either be DCI/PDCCH-based (e.g., DCI format 2_6 in NR used for connected mode decoded as a regular PDCCH) or sequence-based (a specific sequence that the WD 22 searches for and/or correlates with). The WD 22 regularly decodes and searches for a WUS at preconfigured occasions. When there is imminent data to be scheduled for the WD 22 by the network node 16, a WUS is transmitted by the network node 16 based on which the WD 22 knows that it should wake up, prepare itself for reception (perform channel estimation), and receive a potential message at a specified occasion, as shown in FIG. 13. However, note that such prior art WUS signals are transmitted by the network node 16 in addition to existing paging-related transmission. Thus, there is an extra burden for the network node 16 and increased resources over the air are occupied, leading to reduced system capacity.

Figure 14:
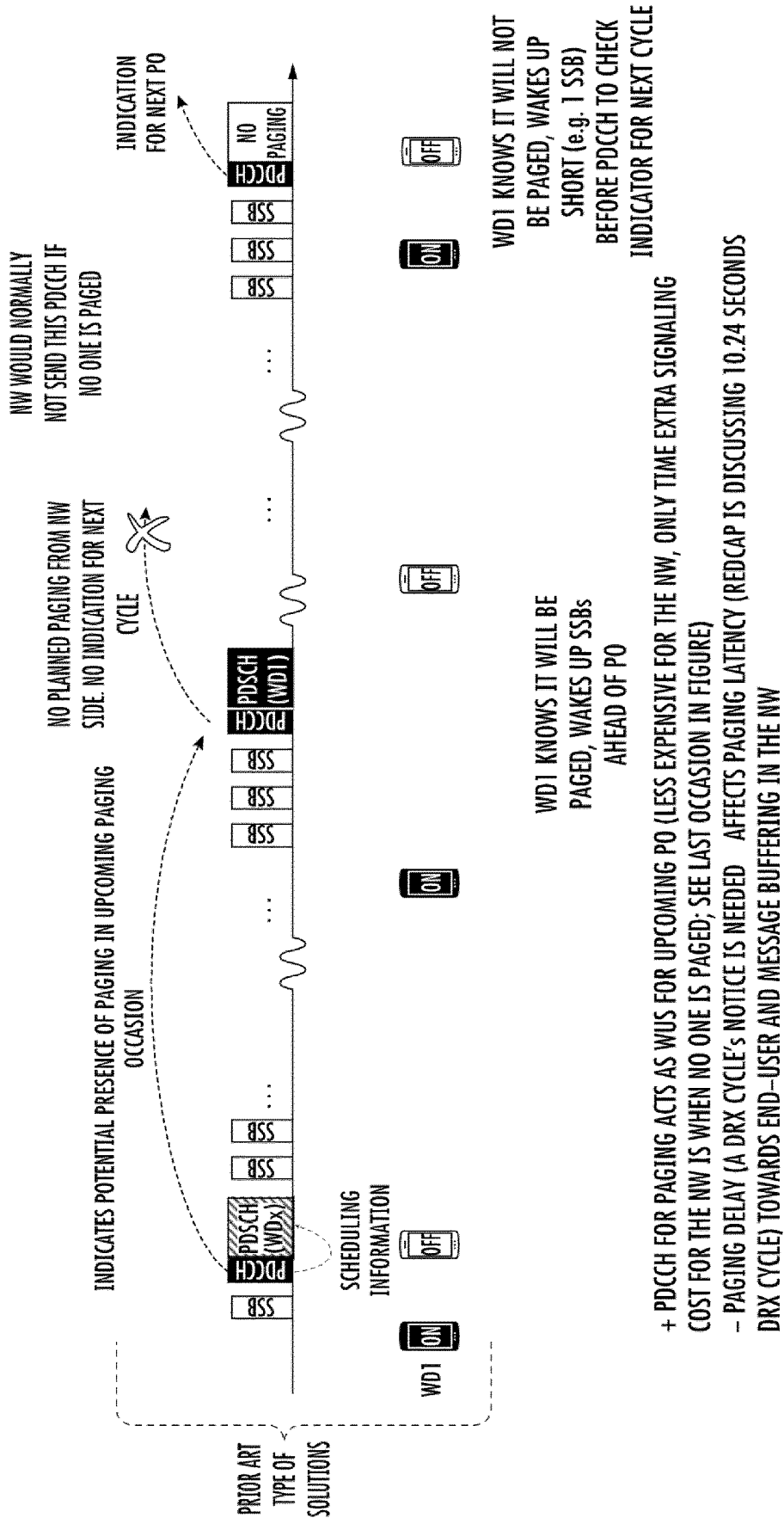
FIG. 14 depicts a scheme in which wake up signal (WUS) information is embedded in an existing physical downlink control channel (PDCCH) used for paging.

The network node 16 may transmit WUSs at extra occasions prior to a data scheduling occasion in some embodiments. Some embodiments provide paging indicators (so called paging WUSs) with minimal effort from the network node 16 and with minimal waste of system capacity as compared to known methods. One way to enable this is to provide the WUS within other signals (e.g., multiplexed with another signal) that are already being transmitted by the network node 16. Such a scheme is depicted in FIG. 14, where the information within the PDCCH used for paging is extended to carry WUS information for future POs. In this context, a WUS and early paging indicator can be used interchangeably, i.e., the WD 22 receives an indication regarding receiving a paging message in its own PO earlier than the default configuration where the WD 22 expects to monitor PDCCH in 3GPP Technical Releases 15 and 16. If the indicator is present, the WD 22 knows that it has to wake up early enough ahead of the future PO for channel processing and paging reception purposes (e.g., 3 SSBs ahead in FIG. 14 may be required for a PO early enough (e.g., one SSB ahead of a PO) for processing the PDCCH to see whether paging transmission is planned in future PO(s).

PDCCH and PDSCH processing: if the indicator is not present (or present but does not indicate transmission in a future PO), the WD 22 needs only to wake up.

FIG. 14 depicts a scheme in which the WUS information is embedded in the existing PDCCH used for paging.

However, the solution depicted in FIG. 14 may not be optimal for two reasons. Firstly, there is latency (end-to-end) involved in reaching the WD 22, since there is an inherent lag of at least a complete DRX cycle for each paging transmission. In other words, the network node 16 cannot page the WD 22 immediately but has to warn the WD 22 that it will be paged at the next DRX cycle. Secondly, during this delay, the potential paging messages have to be buffered in the network node 16 which is resource consuming, and is especially problematic when many WDs 22 are being paged and the network node 16 has to buffer many messages. Note also that even though the current DRX cycles specified by the 3GPP in the range from 320 ms . . . 2.56 s, an extended range to 10.24 s and even beyond has been considered but would lead to excessive delays and buffering.

Figure 15:
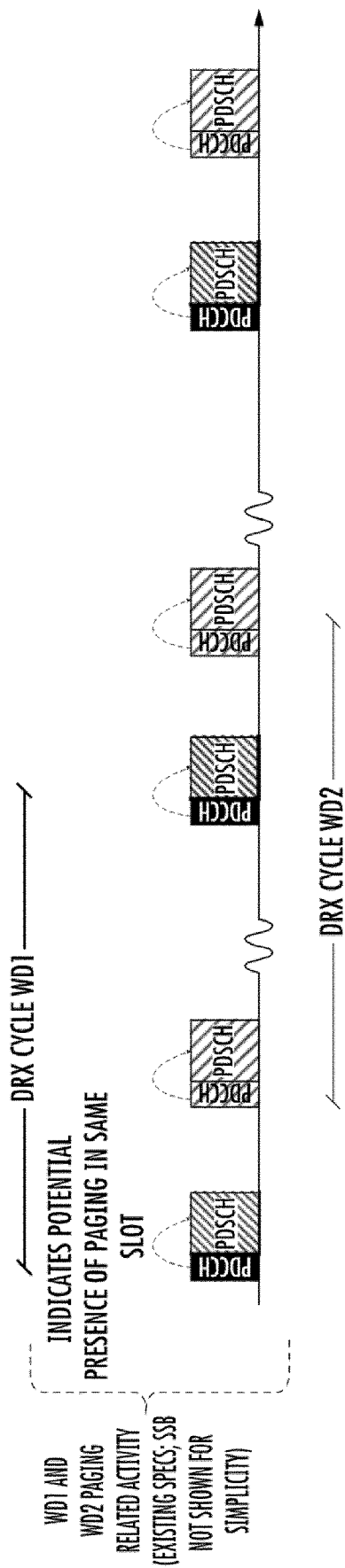
FIG. 15 is an example with 2 WDs assigned to two different POs, where on a periodic basis (DRX cycle), each WD wakes up at a different occasion for its paging related activity.

Some embodiments take advantage of the condition that the network node 16 typically configures multiple POs during a DRX cycle. Also, different WDs 22 may be assigned to different POs, e.g., based on their WD identity. An example is depicted in FIG. 15 where WD1 and WD2 are assigned to two different POs. In the current 3GPP specifications, the network node 16 may configure up to 4 POs per frame (10 ms frame). For example, when the DRX cycle is configured to be 1.28 s (128 frames), there can be up to 512 POs during the course of 1.28 s. The network node 16 can further tailor the exact position of each of these POs in time in relation to each other; see 3GPP Technical Standard (TS) 38.331 (PCCH-Config contained in SIB1) for further details on paging configuration.

FIG. 15 is an example with 2 WDs 22 assigned to two different POs. On a periodic basis (DRX cycle), each WD 22 wakes up at a different occasion for its paging related activity.

As can be seen in FIG. 15, the distance between the POs of WD1 and WD2 is shorter than the distance between different POs of WD1. Hence, some embodiments use the PDCCH of one PO as the occasion for providing WUS information related to another PO and thereby get rid of, or substantially reduce, the latency and buffering issues mentioned above. This is exemplified in FIG. 16. The WUS information (i.e., indicator for WD(s) or group of WDs belonging to another PO) can be incorporated in the existing reserved bits of DCI1_0 pointed out above, as an example.

In one example, the network node 16 can configure the WD 22 such that an additional bitfield in DCI 1_0 can be used to indicate the presence or absence of paging in one or more of the upcoming POs.

In one example, the network node 16 can use 1 bit in the paging DCI to indicate presence of paging in an upcoming PO. For example, a bit value of 0 can indicate that there is no paging in the upcoming PO, a value of 1 can indicate that there is paging in the first upcoming PO. The associated upcoming PO can also be part of the configuration, e.g., the a next subsequent PO can be configured or specified by an offset to the current PO, e.g., any PO with a 10 ms, or 20 ms, etc., offset from the current PO.

The indication (1st) PO may be configured to have a desired offset to the designated PO for the WD 22 (2nd PO). The time offset between the 1st and 2nd PO may be selected to allow the WD 22 to acquire a number of SSBs sufficient for paging PDSCH reception preparation. In systems with a 20 ms SSB period, offset values in the range 20-60 ms may be used. The network node 16 may select the offset to support a sufficient preparation for all WDs 22, including worst-case WDs 22. Alternatively, to reduce the offset (and thereby reduce the delay and reduce the power consumption for WDs 22 that do not require the maximum preparation time) the network node 16 may select the offset to support a subset of WDs 22 in the cell with link quality exceeding a worst case as may be specified by a threshold.

In one embodiment, the WD 22 may determine the number of SSBs required for preparation, based on link quality, and determine whether the configured offset permits sufficient preparation. If not, the WD 22 may not utilize the advance indication function but monitor its designated PO as in legacy operation, including receiver preparation at each DRX cycle.

In another embodiment, if the WD 22 observes that the indication is provided in a large fraction of DRX cycles, the WD may also choose to not utilize the advance indication function but monitor its designated PO as in legacy operation.

The WD 22 may have information about all POs configured by the network node 16 based on the configuration provided in system information (SI), so the WD 22 can determine the PO that precedes the PO designated for the WD 22 with the specified offset. The WD 22 then monitors the preceding PO for a paging PDCCH. If the WD 22 detects the indicator bit, the WD 22 may perform preparation activities, e.g., higher-quality time/frequency (T/F) synchronization, during the time offset before the WD's designated PO, monitors the PDCCH of the designated PO, and receives the PDSCH if indicated in the paging DCI for the WD 22.

Below, a PO configuration relevant to paging reception is denoted POpaging (i.e., the 2nd PO mentioned above), and the PO relevant for WUS (i.e., the 1st PO mentioned above) is denoted POWUS.

In one embodiment, the POWUS has a shorter DRX cycle than the POpaging. Then the WD 22 may only use the POWUS during a certain interval before its designated PO. Different WDs 22 may then use different time intervals, and may share the same indicator bit(s) in the indication DCI. This interval may be deduced in different ways: If the POWUS DRX cycle is n times the POpaging DRX cycle, the WD 22 can use a fraction (e.g., the last 1/n part) of the DRX cycle nearest to the POpaging. In an alternate embodiment, the intervals are network node configured; in yet another alternate embodiment, the length of intervals are calculated based on the WD capability, i.e., how many SSB occasions the WD 22 would need to obtain adequate synchronization. When multiple WDs 22 share the same bits in the indication DCI, the intervals may or may not be overlapping; having overlapping intervals will however wake up more WDs 22 than the one WD 22 that is to receive the paging.

In a related example, the network node 16 can configure the WD 22 with multiple bits, e.g., 2 bits, to indicate presence of the paging in the upcoming POs, e.g., a bit combination of 00 can indicate that there is no paging in the upcoming POs, a combination of 01 indicates there is paging in the first upcoming PO, a combination of 10 indicates there is paging in the second upcoming PO, and a 11 combination indicates there is paging in the third upcoming PO. The configuration of the additional bitfield, its size, as well as its interpretation can be part of the network node 16 configuration for paging. In some embodiments, the rest of the paging DCI content remains as in the case of 3GPP Rel-15/16, i.e., an indication of the paging PDSCH belonging to the current DCI, and the additional bitfield is just used as an indicator.

In one example, the indicator bits in the POWUS create an index, where each index relates to a single WD 22 or a group of WDs 22. Using an index value instead of a bitfield will only make it possible to indicate one index per POWUS, but may reduce WD 22 power consumption, thereby minimizing the number of times WDs 22 are woken up.

In another embodiment, not every PO may be used for advance indication, but only a subset, so that each such indication PO carries information about multiple coming POs. In one embodiment, one indicator bit or field value can indicate possible paging in multiple upcoming POs. In another embodiment, the indicator can indicate in which upcoming PO there would be a paging PDSCH, and the rest of the DCI payload determines the associated resources where the WD 22 can decode the paging PDSCH. The indicator bit field can constitute a bitmap informing WDs 22 which one or more of the upcoming POs will contain paging. The subset of POs carrying advance indication information may be provided, e.g., via SI; the WD 22 may identify the closest indication PO preceding its designated PO for indication monitoring.

In another example, if the network node 16 does not send the indication bitfield or the paging PDCCH, or the WD 22 misses the detection of the paging PDCCH or the early paging indicator, the WD 22 may consider that it should monitor the WD's PO, and decode the corresponding paging PDCCH. The WD behavior when it has not received the corresponding indicator PDCCH, or it has missed its detection can also be part of the paging configuration by the network node 16 and communicated to the WD 22 through, SI update or SIB1, for example. Or, the WD behavior can be defined as part of the standardization. For example, the WD behavior may be specified or the WD 22 may be configured to rely on POWUS only when certain criteria are fulfilled (e.g., when the WD 22 is in good coverage, or low mobility, etc.), and if the criteria is not fulfilled, the WD 22 wakes up regularly at POpaging.

In another example, an indicator in paging DCI can be added such that the WD 22 can determine if the paging DCI is a paging message, or contains a short message, or is an early paging indicator for another PO. In case the indicator is related to early paging (WUS), then the rest of the payload can be used as an indication of where the paging PDSCH should be decoded. Alternatively, the indicator can be interpreted as indicating that the current PDCCH is a paging message as well as an early paging indicator. This means, for example that the DCI payload may indicate the paging PDSCH for the current PDSCH as well as the indication that, e.g., there is paging in one of the upcoming POs.

In all the examples above, an alternative indicator can refer to an invalid index in the current 3GPP Technical Releases 15 and 16 paging DCI, e.g., an invalid modulation and coding scheme (MCS) index.

In all the examples above, the configuration can be communicated to the WD 22 through dedicated signaling, e.g., radio resource control (RRC), SI update, e.g., SIB1, or alternatively, as part of the RRC release. In case of the latter, in one example, the WD 22 can assume the configuration is valid in a specific RNA (RAN notification area) if the WD 22 is in the RRC_INACTIVE state, but if the WD 22 is in the RRC_IDLE state, then the WD 22 may need to reacquire the paging configuration through SI when moving to a new cell. In both cases, when the configuration is provided to the WD 22 through SI, the WD 22 needs to reacquire the paging configuration if it has moved to a new cell. Further, in some embodiments, the WD 22 is configured with a specific paging configuration that is applicable to a specific PO, i.e., one or more POs are configured with the specific paging configuration, and the associated early indicator is also configured as such for the corresponding PO. Since each WD 22 is assigned to a specific PO, a WD 22 may be configured so that one or more specific POs are configured with the specific paging configurations in some embodiments.

In the examples above, if the PO is additionally configured with multiple beams, in one example, the WD 22 may assume that the paging indications are similar among all the POs. In another example, the network node 16 may choose not to send the early paging indication in all the paging PDCCHs in each beam. If the network node chooses to send the early paging indication in one or more paging PDCCHs in each beam, the indications are not contradictory to each other. Yet, in another example, the network node 16 may send contradictory early paging indicators in each beam, and in this case the WD 22 behavior is either defined in the standardization specifications, or preconfigured by the network node 16 as part of the paging configuration. For example, the network node 16 might know the exact position of the WD 22, and hence, only provide the WUS in relevant beams.

Figure 16:
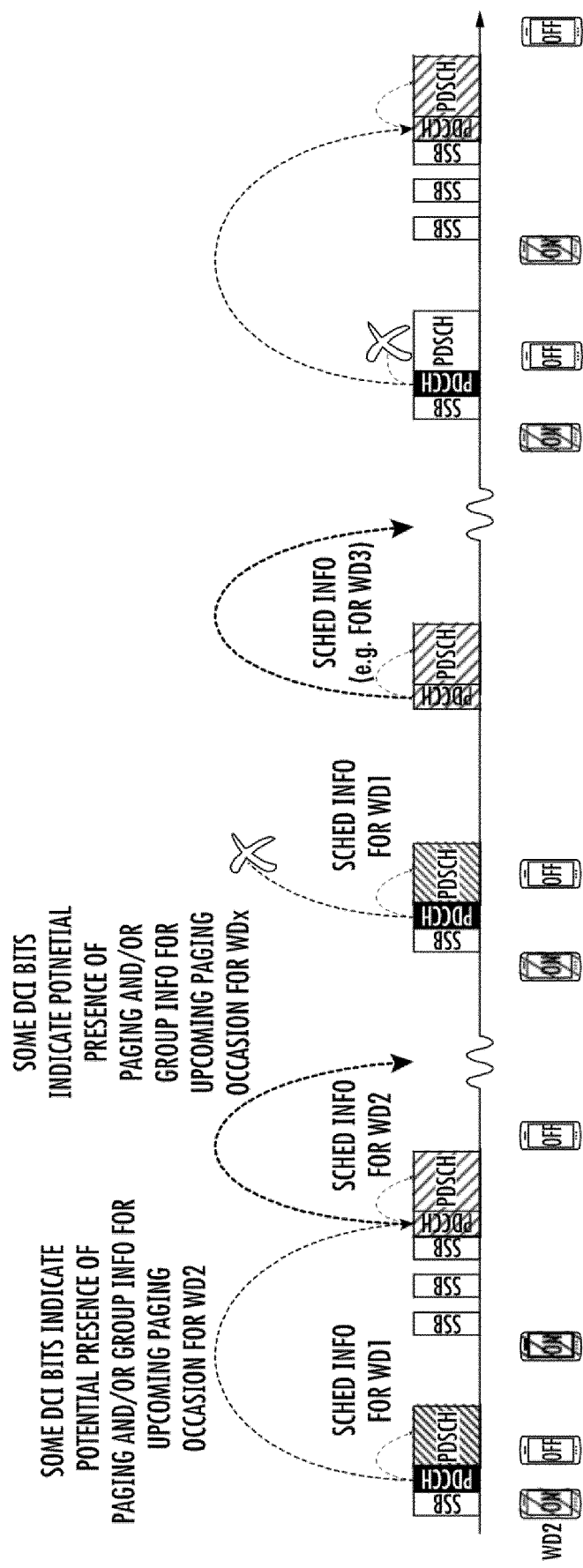
FIG. 16 depicts the PDCCH of a PO assigned to a first WD, WD1, being used to convey a WUS for the PO assigned to a second WD, WD2.

FIG. 16 depicts a PDCCH of PO assigned to WD1 being used to convey a WUS for the PO assigned to WD2.

The network node 16 can then, in addition to the existing 3GPP paging configuration provided to the WD 22, further provide configuration for POs in which WUS information can be derived. The network node 16 can also tune the exact position of POs in relation to each other such that they are close enough to each other to reduce the latency/buffering issue but still far enough to fit synchronization signals needed for PDSCH reception.

As a result, the network node 16 is utilizing the already existing transmissions to convey WUSs. The only occasions when the network node 16 has to transmit the WUS as an extra transmission is when no WD 22 is paged at all at a certain PO. See the last occasion on timeline of FIG. 16 as an example.

In short, some embodiments may include one or more of the following steps:

The network node 16 configures the WDs 22 that are capable of the feature with additional PO configurations used for WUS transmission; i.e., one PO configuration is relevant to paging reception (POpaging), and another PO is relevant for WUS (POWUS);

The network node 16 informs the WD 22 which of the paging DCI bits at POWUS are to be used as WUS (e.g., one or multiple reserved bits of DCI1_0 with CRC scrambled with P-RNTI). Note that different WDs 22 may be assigned different bits depending on grouping criteria;

Upon each planned paging, the network node 16 indicates at POWUS whether the WDs 22 have to wake up and decode at upcoming POpaging;

The WD 22 adapts its operations based on information received from the network node 16; e.g., whether to remain in or go to a sleep state in relation to POpaging when no paging is indicated.

Figure 17:
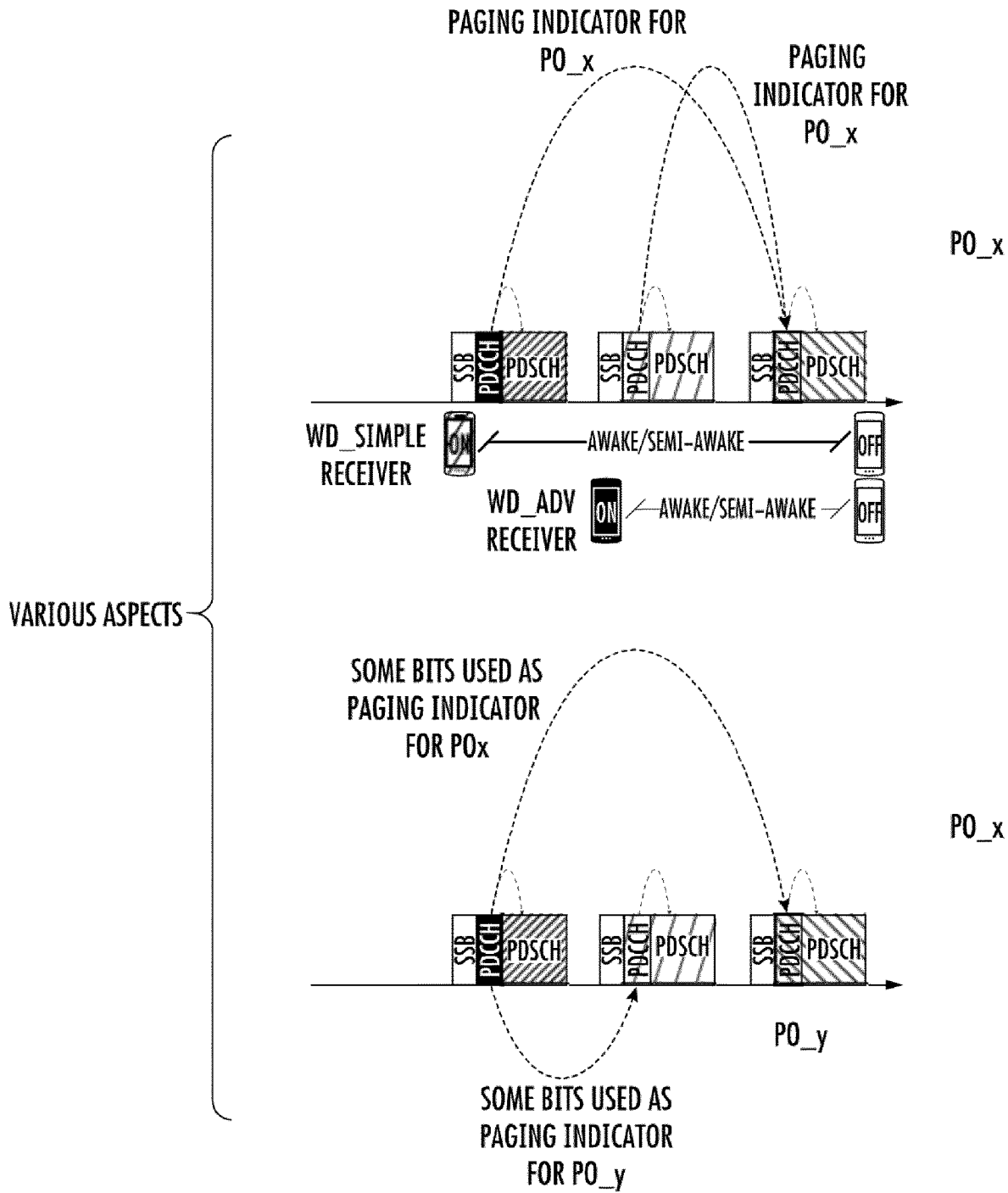
FIG. 17 depicts different WDs that may require different amount of SSB processing before paging reception.

In the embodiment shown in FIG. 17, different WDs 22 may require different amounts of SSB processing before paging reception. Hence, for the very same POpaging, the network node 16 may configure POWUS differently.

In some embodiments, the network node 16 adapts the POWUS configuration to WD 22 type and/or capability. For example, as depicted in FIG. 17 in some embodiments, for the same POpaging, the POWUS configurations/occasions are different. As such, the configuration may be adapted based on WD 22 type (e.g., retrieved from subscription information, for example) and/or WD 22 capability. In some embodiments, the configuration may be adapted based on WD 22 coverage level (e.g., for stationary WDs 22) or based on specific input provided by the WD 22 to the network node 16.

Some embodiments include multiplexing the early paging indication in the current paging DCI, as in DCI format 1-0. However, in an alternative example, a new DCI format can be developed to multiplex the early paging indication in the same resources as DCI format 1-0, or in the new DCI format's own resources including an association of a search space (SS) and a Coreset.

In one embodiment, the POWUS are sent with a higher aggregation level than the POpaging. (Higher aggregation level means to use a larger number (e.g., 8 or 16) of control channel elements (CCE) for the PDCCH, thereby lowering the code rate for the control channel.) Then this will relax the requirements on the WD 22 synchronization and sensitivity of reading the indicator DCI, which will allow the WD 22 to use even lower power between monitoring the early paging indicator, e.g., using low power hardware. For the actual paging messages designated to the WDs 22, sometimes a lower AL may be used, for WDs 22 that the network node 16 assumes are in good radio conditions. As a large aggregation level requires a large bandwidth, in one embodiment, a wider BWP (bandwidth part) is used for RRC_idle and RRC_inactive.

According to one aspect, a network node 16 is configured to communicate with a wireless device (WD). The network node 16 includes processing circuitry 68 configured to at a first paging occasion (PO) in which the network node 16 transmits paging-related downlink control information to a first group of WDs 22, multiplex paging indicators related to one or more POs to be monitored by a WD 22 belonging to a second group of WDs 22.

According to this aspect, in some embodiments, the processing circuitry 68 is further configured to use transmission related to a first PO for conveying information about an existence of a page of the WD 22 belonging to the second group of WDs 22. In some embodiments, a time between two successive Pos is selected to enable the WD 22 belonging to the second group of WDs 22 to acquire synchronization signals for physical downlink shared channel (PDSCH) reception preparation.

According to another aspect, a method implemented in a network node 16 is provided. The method includes at a first paging occasion (PO) in which the network node 16 transmits paging-related downlink control information to a first group of WDs 22, multiplexing paging indicators related to one or more POs to be monitored by a WD 22 belonging to a second group of WDs 22.

According to this aspect, in some embodiments, transmissions related to a first PO for conveying information about an existence of a page of the WD 22 belonging to the second group of WDs 22 are used. In some embodiments, a time between two successive Pos is selected to enable the WD 22 belonging to the second group of WDs 22 to acquire synchronization signals for physical downlink shared channel (PDSCH) reception preparation.

According to yet another aspect, a WD 22 is configured to communicate with a network node 16. The WD 22 includes processing circuitry 84 configured to: when an indicator at a first occasion is detected, perform paging operations that include preparing for physical downlink control channel (PDCCH) reception; and when the indicator at the first occasion is not detected, omit to prepare for the PDCCH reception.

According to this aspect, in some embodiments, the processing circuitry 84 is further configured acquire a number of synchronization signals sufficient to prepare physical downlink shared channel (PDSCH) reception. In some embodiments, the processing circuitry 84 is further configured to determine a paging occasion the precedes a designated paging occasion having a specified offset.

According to another aspect, a method is implemented in a wireless device 22. The method includes when an indicator at a first occasion is detected, performing paging operations that include preparing for physical downlink control channel (PDCCH) reception; and when the indicator at the first occasion is not detected, omitting to prepare for the PDCCH reception According to this aspect, in some embodiments, a number of synchronization signals are acquired sufficient to prepare physical downlink shared channel (PDSCH) reception. In some embodiments, a paging occasion the precedes a designated paging occasion having a specified offset is determined.

According to one aspect, a network node 16 configured to communicate with a plurality of wireless devices is provided. The network node 16 includes processing circuitry 68 configured to provide a wake up signal for transmission in a downlink control channel associated with a first paging opportunity assigned to a first WD 22, the wake up signal indicating to a second WD 22 to wake up for a second paging opportunity assigned to the second WD 22, the first paging opportunity being prior to the second paging opportunity. The network node 16 also includes a radio interface 62 in communication with the processing circuitry 68, the radio interface 62 configured to transmit the wake up signal to the second WD 22.

According to this aspect, in some embodiments, the processing circuitry 68 is further configured to set a time between two successive paging opportunities to enable the second WD 22 to acquire synchronization signals for downlink shared channel reception preparation, the time between the two successive paging opportunities being set to be less than a duration of a discontinuous reception cycle of one of the first WD 22 and the second WD 22. In some embodiments, the time setting is selected to achieve a least amount of latency consistent with a duration of a synchronization signal. In some embodiments, the wake up signal is included in a downlink control information, DCI, message carried by a physical downlink control channel, PDCCH. In some embodiments, the radio interface 62 is further configured to transmit an indication to the second WD 22 as to which of at least one paging downlink control information bits of the wake up signal transmitted at the first paging opportunity are to be used to evaluate whether to wake up at the second paging opportunity. In some embodiments, the processing circuitry 68 is further configured to multiplex wake up signals for a plurality of WDs 22, the plurality of WDs 22 including the second WD 22. In some embodiments, the radio interface 62 is further configured to transmit the multiplexed wake up signals using an aggregation of control channel elements. In some embodiments, the wake up signal transmitted at the first paging opportunity includes a plurality of fields for signaling a plurality of WDs 22 including the second WD 22 to wake up. In some embodiments, a bandwidth part is selected to accommodate the aggregation of control channel elements when a WD 22 of the plurality of WDs 22 is in IDLE mode. In some embodiments, the wake up signal for the second paging opportunity is adapted to a capability of the second WD 22. In some embodiments, a capability of the second WD 22 is determined based at least in part on a coverage signal from the second WD 22. In some embodiments, the processing circuitry 68 is further configured to configure the second WD 22 with multiple bits indicating a presence of paging in a particular paging opportunity indicated by the multiple bits. In some embodiments, the wake up signal indicates a subset of subsequent paging opportunity for the second WD 22 to wake up. In some embodiments, the wake up signal is transmitted on a subset of beams transmitted by the network node 16. In some embodiments, the processing circuitry 68 is further configured to indicate in a downlink control information, DCI, message whether the DCI message includes one of a paging message, a short messaging service, SMS, message, and an early indicator of a subsequent paging opportunity. In some embodiments, the DCI indicates a current paging downlink shared channel and a paging at a subsequent paging opportunity.

According to another aspect, a method in a network node 16 configured to communicate with a wireless device is provided. The method includes providing a wake up signal for transmission in a downlink control channel associated with a first paging opportunity assigned to a first WD 22, the wake up signal indicating to a second WD 22 to wake up for a second paging opportunity assigned to the second WD 22, the first paging opportunity being prior to the second paging opportunity. The method also includes transmitting the wake up signal to the second WD 22.

According to this aspect, in some embodiments, the method further includes setting a time between two successive paging opportunities to enable the second WD 22 to acquire synchronization signals for downlink shared channel reception preparation, the time between the two successive paging opportunities being set to be less than a duration of a discontinuous reception cycle of one of the first WD 22 and the second WD 22. In some embodiments, the time setting is selected to achieve a least amount of latency consistent with a duration of a synchronization signal. In some embodiments, the wake up signal is included in a downlink control information, DCI, message carried by a physical downlink control channel, PDCCH. In some embodiments, the method also includes transmitting an indication to the second WD 22 as to which of at least one paging downlink control information bits of the wake up signal transmitted at the first paging opportunity are to be used to evaluate whether to wake up at the second paging opportunity. In some embodiments, the method also includes multiplexing wake up signals for a plurality of WDs 22, the plurality of WDs 22 including the second WD 22. In some embodiments, the method also includes transmitting the multiplexed wake up signals using an aggregation of control channel elements. In some embodiments, the wake up signal transmitted at the first paging opportunity includes a plurality of fields for signaling a plurality of WDs 22 including the second WD 22 to wake up. In some embodiments, a bandwidth part is selected to accommodate the aggregation of control channel elements when a WD 22 of the plurality of WDs 22 is in IDLE mode. In some embodiments, the wake up signal for the second paging opportunity is adapted to a capability of the second WD 22. In some embodiments, a capability of the second WD 22 is determined based at least in part on a coverage signal from the second WD 22. In some embodiments, the method includes configuring the second WD 22 with multiple bits indicating a presence of paging in a particular paging opportunity indicated by the multiple bits. In some embodiments, the wake up signal indicates a subset of subsequent paging opportunity for the second WD 22 to wake up. In some embodiments, the wake up signal is transmitted on a subset of beams transmitted by the network node 16. In some embodiments, the method further includes indicating in a downlink control information, DCI, message whether the DCI message includes one of a paging message, a short messaging service, SMS, message, and an early indicator of a subsequent paging opportunity. In some embodiments, the DCI indicates a current paging downlink shared channel and a paging at a subsequent paging opportunity.

According to yet another aspect, a wireless device 22 is configured to communicate with a network node 16. The WD 22 includes a radio interface 82 configured to receive a wake up signal from the network node 16 prior to a first paging opportunity and before an end to a discontinuous reception, DRX, cycle used by the WD 22, the DRX cycle encompassing the first paging opportunity, the wake up signal being transmitted in a downlink control channel associated with a second paging opportunity assigned with a different WD 22, and to receive a paging signal from the network node 16 at the first paging opportunity, the second paging opportunity being prior to the first paging opportunity. The WD 22 also includes processing circuitry 84 in communication with the radio interface 82, the processing circuitry 84 configured to evaluate synchronization signals between a time of receiving the paging signal and a time of receiving the wake up signal.

According to this aspect, in some embodiments, the radio interface 82 is further configured to receive an indication of at least one downlink control information bit to be evaluated to determine whether to wake up. In some embodiments, the processing circuitry 84 is further configured to select a paging opportunity based on an indication included in the wake up signal. In some embodiments, the processing circuitry 84 is further configured to decode a downlink control channel at a paging opportunity corresponding to the first paging opportunity when the WD 22 fails to detect the indication. In some embodiments, the processing circuitry is further configured to assume a network wide applicability of a paging configuration when the WD 22 is in an inactive state and to reacquire a paging configuration when the WD 22 is in an idle state.

According to another aspect, a method in a wireless device 22 configured to communicate with a network node 16 is provided. The method includes receiving a wake up signal from the network node 16 prior to a first paging opportunity and before an end to a discontinuous reception, DRX, cycle used by the WD 22, the first DRX cycle encompassing the first paging opportunity, the wake up signal being transmitted in a downlink control channel associated with a second paging opportunity assigned to a different WD 22. The method also includes receiving a paging signal from the network node 16 at the first paging opportunity, the second paging opportunity being prior to the first paging opportunity. The method also includes evaluating synchronization signals between a time of receiving the paging signal and a time of receiving the wake up signal.

According to this aspect, in some embodiments, the method also includes receiving an indication of at least one downlink control information bit to be evaluated to determine whether to wake up. In some embodiments, the method includes selecting a paging opportunity based on an indication included in the wake up signal. In some embodiments, the method includes decoding a downlink control channel at a paging opportunity corresponding to the first paging opportunity when the WD 22 fails to detect the indication. In some embodiments, the method includes assuming a network wide applicability of a paging configuration when the WD 22 is in an inactive state and to reacquire a paging configuration when the WD 22 is in an idle state.

The following is a non-exhaustive list of some more example embodiments:

Embodiment A1. A network node 16 configured to communicate with a wireless device, WD 22, the network node 16 configured to, and/or comprising a radio interface and/or comprising processing circuitry configured to:

at a first paging occasion, PO, in which the network node 16 transmits paging-related downlink control information to a first group of WDs 22, multiplex paging indicators related to one or more POs to be monitored by a WD 22 belonging to a second group of WDs 22.

Embodiment A2. The network node 16 of Embodiment A1, wherein the network node 16 and/or the radio interface and/or the processing circuitry is further configured to use transmission related to a first PO for conveying information about an existence of a page of the WD 22 belonging to the second group of WDs 22.

Embodiment A3. The network node 16 of Embodiment A1, wherein a time between two successive Pos is selected to enable the WD 22 belonging to the second group of WDs 22 to acquire synchronization signals for physical downlink shared channel, PDSCH, reception preparation.

Embodiment B1. A method implemented in a network node 16, the method comprising:

at a first paging occasion, PO, in which the network node 16 transmits paging-related downlink control information to a first group of WDs 22, multiplexing paging indicators related to one or more POs to be monitored by a WD 22 belonging to a second group of WDs 22.

Embodiment B2. The method of Embodiment B1, wherein transmissions related to a first PO for conveying information about an existence of a page of the WD 22 belonging to the second group of WDs 22 are used.

Embodiment B3. The method of Embodiment B1, wherein a time between two successive Pos is selected to enable the WD 22 belonging to the second group of WDs 22 to acquire synchronization signals for physical downlink shared channel, PDSCH, reception preparation.

Embodiment C1. A wireless device, WD 22, configured to communicate with a network node 16, the WD 22 configured to, and/or comprising a radio interface and/or processing circuitry configured to:

when an indicator at a first occasion is detected, perform paging operations that include preparing for physical downlink control channel, PDCCH, reception; and when the indicator at the first occasion is not detected, omit to prepare for the PDCCH reception.

Embodiment C2. The WD 22 of Embodiment C1, wherein the WD 22 and/or the radio interface and/or the processing circuitry is further configured acquire a number of synchronization signals sufficient to prepare physical downlink shared channel, PDSCH, reception.

Embodiment C3. The WD 22 of Embodiment C1, wherein the WD 22 and/or the radio interface and/or the processing circuitry is further configured to determine a paging occasion the precedes a designated paging occasion having a specified offset.

Embodiment D1. A method implemented in a wireless device, WD 22, the method comprising:

when an indicator at a first occasion is detected, performing paging operations that include preparing for physical downlink control channel, PDCCH, reception; and when the indicator at the first occasion is not detected, omitting to prepare for the PDCCH reception Embodiment D2. The method of Embodiment D1, wherein a number of synchronization signals sufficient to prepare physical downlink shared channel, PDSCH, reception are acquired.

Embodiment D3. The method of Embodiment D1, wherein a paging occasion the precedes a designated paging occasion having a specified offset is determined.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a plurality of wireless devices, WDs, the network node comprising:
   processing circuitry configured to:
      provide a wake up signal for transmission in a downlink control channel associated with a first paging opportunity assigned to a first WD, the wake up signal indicating to a second WD to wake up for a second paging opportunity assigned to the second WD, the first paging opportunity being prior to the second paging opportunity; and
      set a time between two successive paging opportunities to enable the second WD to acquire synchronization signals for downlink shared channel reception preparation, the time between the two successive paging opportunities being set to be less than a duration of a discontinuous reception cycle of one of the first WD and the second WD, the time setting selected to achieve a least amount of latency consistent with a duration of a synchronization signal; and
   a radio interface in communication with the processing circuitry, the radio interface configured to transmit the wake up signal to the second WD.

2. The network node of claim 1, wherein the wake up signal is included in a downlink control information, DCI, message carried by a physical downlink control channel, PDCCH.

3. The network node of claim 1, wherein the radio interface is further configured to transmit an indication to the second WD as to which of at least one paging downlink control information bits of the wake up signal transmitted at the first paging opportunity are to be used to evaluate whether to wake up at the second paging opportunity.

4. The network node of claim 1, wherein the processing circuitry is further configured to multiplex wake up signals for a plurality of WDs, the plurality of WDs including the second WD.

5. The network node of claim 4, wherein the radio interface is further configured to transmit the multiplexed wake up signals using an aggregation of control channel elements.

6. The network node of claim 1, wherein the wake up signal transmitted at the first paging opportunity includes a plurality of fields for signaling a plurality of WDs including the second WD to wake up.

7. The network node of claim 6, wherein a bandwidth part is selected to accommodate an aggregation of control channel elements when a WD of the plurality of WDs is in IDLE mode.

8. The network node of claim 1, wherein the wake up signal for the second paging opportunity is adapted to a capability of the second WD.

9. The network node of claim 8, wherein a capability of the second WD is determined based at least in part on a coverage signal from the second WD.

10. The network node of claim 1, wherein the processing circuitry is further configured to configure the second WD with multiple bits indicating a presence of paging in a particular paging opportunity indicated by the multiple bits.

11. The network node of claim 1, wherein the wake up signal indicates a subset of subsequent paging opportunities for the second WD to wake up.

12. The network node of claim 1, wherein the wake up signal is transmitted on a subset of beams transmitted by the network node.

13. The network node of claim 1, wherein the processing circuitry is further configured to indicate in a downlink control information, DCI, message whether the DCI message includes one of a paging message, a short messaging service, SMS, message, and an early indicator of a subsequent paging opportunity.

14. The network node of claim 13, wherein the DCI indicates a current paging downlink shared channel and a paging at a subsequent paging opportunity.

15. A method in a network node configured to communicate with a wireless device, WD, the method comprising:
   providing a wake up signal for transmission in a downlink control channel associated with a first paging opportunity assigned to a first WD, the wake up signal indicating to a second WD to wake up for a second paging opportunity assigned to the second WD, the first paging opportunity being prior to the second paging opportunity;
   setting a time between two successive paging opportunities to enable the second WD to acquire synchronization signals for downlink shared channel reception preparation, the time between the two successive paging opportunities being set to be less than a duration of a discontinuous reception cycle of one of the first WD and the second WD, the time setting selected to achieve a least amount of latency consistent with a duration of a synchronization signal; and transmitting the wake up signal to the second WD.

16. The method of claim 15, wherein the wake up signal is included in a downlink control information, DCI, message carried by a physical downlink control channel, PDCCH.

17. A wireless device, WD, configured to communicate with a network node, the WD comprising:
a radio interface configured to receive a wake up signal from the network node prior to a first paging opportunity and before an end to a discontinuous reception, DRX, cycle used by the WD, the DRX cycle encompassing the first paging opportunity, the wake up signal being transmitted in a downlink control channel associated with a second paging opportunity associated with a different WD, and to receive a paging signal from the network node at the first paging opportunity, the second paging opportunity being prior to the first paging opportunity and the time between two successive paging opportunities set to enable the different WD to acquire synchronization signals for downlink shared channel reception preparation, the time between the two successive paging opportunities being set to be less than a duration of a discontinuous reception cycle of one of the WD and the different WD, the time setting selected to achieve a least amount of latency consistent with a duration of a synchronization signal; and
processing circuitry in communication with the radio interface, the processing circuitry configured to:
evaluate synchronization signals between a time of receiving the paging signal and a time of receiving the wake up signal.

18. The WD of claim 17, wherein the processing circuitry is further configured to select a paging opportunity based at least in part on an indication included in the wake up signal.

19. The WD of claim 18, wherein the processing circuitry is further configured to decode a downlink control channel at a paging opportunity corresponding to the first paging opportunity when the WD fails to detect the indication.

20. A method in a wireless device, WD, configured to communicate with a network node, the method comprising:
receiving a wake up signal from the network node prior to a first paging opportunity and before an end to a discontinuous reception, DRX, cycle used by the WD, the DRX cycle encompassing the first paging opportunity, the wake up signal being transmitted in a downlink control channel associated with a second paging opportunity associated with a different WD, the time between two successive paging opportunities set to enable the different WD to acquire synchronization signals for downlink shared channel reception preparation, the time between the two successive paging opportunities being set to be less than a duration of a discontinuous reception cycle of one of the WD and the different WD, the time setting selected to achieve a least amount of latency consistent with a duration of a synchronization signal;
receiving a paging signal from the network node at the first paging opportunity, the second paging opportunity being prior to the first paging opportunity; and
evaluating synchronization signals between a time of receiving the paging signal and a time of receiving the wake up signal.

21. The method of claim 20, further comprising receiving an indication of at least one downlink control information bit to be evaluated to determine whether to wake up.

* * * * *